(12) United States Patent
Dangy Caye

(10) Patent No.: US 10,691,166 B2
(45) Date of Patent: Jun. 23, 2020

(54) WEARABLE ELECTRONIC DEVICE HAVING MULTIPLE TOUCH SENSITIVE AREAS OUTSIDE OF VIEWABLE DISPLAY AREA

(71) Applicant: Huawei Technologies Co., Ltd., Shenzhen (CN)

(72) Inventor: Nicolas Dangy Caye, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

(21) Appl. No.: 15/776,332

(22) PCT Filed: Jul. 4, 2016

(86) PCT No.: PCT/EP2016/065670
§ 371 (c)(1),
(2) Date: May 15, 2018

(87) PCT Pub. No.: WO2018/006930
PCT Pub. Date: Jan. 11, 2018

(65) Prior Publication Data
US 2018/0321786 A1    Nov. 8, 2018

(51) Int. Cl.
*G06F 1/16*    (2006.01)
*G06F 3/0488*    (2013.01)
(Continued)

(52) U.S. Cl.
CPC ............. *G06F 1/163* (2013.01); *G04G 21/08* (2013.01); *G06F 3/044* (2013.01); *G06F 3/0416* (2013.01);
(Continued)

(58) Field of Classification Search
CPC .... G06F 3/04883; G06F 3/0488; G06F 3/016; G06F 3/0485; G06F 3/041; G06F 3/0486;
(Continued)

(56) References Cited

U.S. PATENT DOCUMENTS

2002/0101457 A1*  8/2002  Lang ................... G06F 1/163
                                                         715/856
2011/0069041 A1    3/2011  Cohen et al.
(Continued)

FOREIGN PATENT DOCUMENTS

CN    103412722 A    11/2013
CN    104737105 A    6/2015
(Continued)

OTHER PUBLICATIONS

Foreign Communication From a Counterpart Application, PCT Application No. PCT/EP2016/065670, International Search Report dated Mar. 21, 2017, 5 pages.
(Continued)

*Primary Examiner* — Darlene M Ritchie
(74) *Attorney, Agent, or Firm* — Conley Rose, P.C.

(57) ABSTRACT

An electronic device includes a housing, a display, a first touch sensitive area, a second touch sensitive area, and a processor. The display is coupled with the housing and has a viewable area for presenting visual information. The processor is disposed within the housing and is coupled with the display, and the touch sensitive areas. Both touch sensitive areas are disposed outside of the viewable area of the display, and both touch sensitive areas are supporting sliding gesture detection.

18 Claims, 23 Drawing Sheets

(51) Int. Cl.
*G04G 21/08* (2010.01)
*G06F 3/041* (2006.01)
*G06F 3/044* (2006.01)

(52) U.S. Cl.
CPC .. *G06F 3/04883* (2013.01); *G06F 2203/0339* (2013.01)

(58) Field of Classification Search
CPC ............. G06F 3/03547; G06F 3/04886; G06F 3/04842; G06F 3/0416; G06F 3/044; G06F 1/163; G06F 2203/04105; G06F 2203/0339; A63B 24/0062; A63B 2071/0663; G04G 21/08
See application file for complete search history.

(56) References Cited

U.S. PATENT DOCUMENTS

| | | | |
|---|---|---|---|
| 2012/0099406 | A1 | 4/2012 | Lau et al. |
| 2014/0104240 | A1* | 4/2014 | Eriksson ................. G06F 1/169 345/175 |
| 2014/0143737 | A1* | 5/2014 | Mistry .................. G06F 3/0488 715/854 |
| 2014/0375579 | A1* | 12/2014 | Fujiwara ................. G06F 3/041 345/173 |
| 2015/0041289 | A1 | 2/2015 | Ely |
| 2015/0227274 | A1* | 8/2015 | Lee ....................... G06F 3/0483 715/776 |
| 2015/0309536 | A1 | 10/2015 | Dickinson et al. |
| 2016/0026308 | A1 | 1/2016 | Wu et al. |
| 2016/0048200 | A1 | 2/2016 | Kim et al. |
| 2016/0058375 | A1 | 3/2016 | Rothkopf |
| 2016/0098016 | A1 | 4/2016 | Ely et al. |
| 2016/0124637 | A1* | 5/2016 | Yoon ................... G06F 3/04886 715/773 |
| 2016/0259543 | A1* | 9/2016 | Ishihara ................ G06F 1/1675 |
| 2017/0003720 | A1* | 1/2017 | Robinson .............. G06F 1/1692 |
| 2017/0038859 | A1* | 2/2017 | Park ........................ G06F 1/163 |
| 2017/0090614 | A1* | 3/2017 | Kuboyama ............. G06F 3/044 |
| 2017/0220121 | A1* | 8/2017 | Chiu ....................... G06F 1/163 |
| 2017/0285843 | A1* | 10/2017 | Roberts-Hoffman ........................ G06F 3/016 |
| 2018/0067564 | A1 | 3/2018 | Shin |

FOREIGN PATENT DOCUMENTS

| | | |
|---|---|---|
| CN | 104866221 A | 8/2015 |
| CN | 105278717 A | 1/2016 |
| CN | 105320275 A | 2/2016 |
| CN | 105677223 A | 6/2016 |
| WO | 2010097692 A1 | 9/2010 |
| WO | 2014135709 A2 | 9/2014 |
| WO | 2014170469 A1 | 10/2014 |
| WO | 2016048549 A1 | 3/2016 |

OTHER PUBLICATIONS

Foreign Communication From a Counterpart Application, PCT Application No. PCT/EP2016/065670, Written Opinion dated Mar. 21, 2017, 9 pages.
Machine Translation and Abstract of Chinese Publication No. CN103412722, dated Nov. 27, 2013, 31 pages.
Machine Translation and Abstract of Chinese Publication No. CN104737105, dated Jun. 24, 2015, 31 pages.
Machine Translation and Abstract of Chinese Publication No. CN105278717, dated Jan. 27, 2016, 23 pages.
Machine Translation and Abstract of Chinese Publication No. CN105677223, dated Jun. 15, 2016, 23 pages.
Foreign Communication From a Counterpart Application, Chinese Application No. 201680057363.6, Chinese Office Action dated Jul. 3, 2019, 8 pages.
Machine Translation and Abstract of Chinese Publication No. CN104866221, dated Aug. 26, 2015, 31 pages.

* cited by examiner

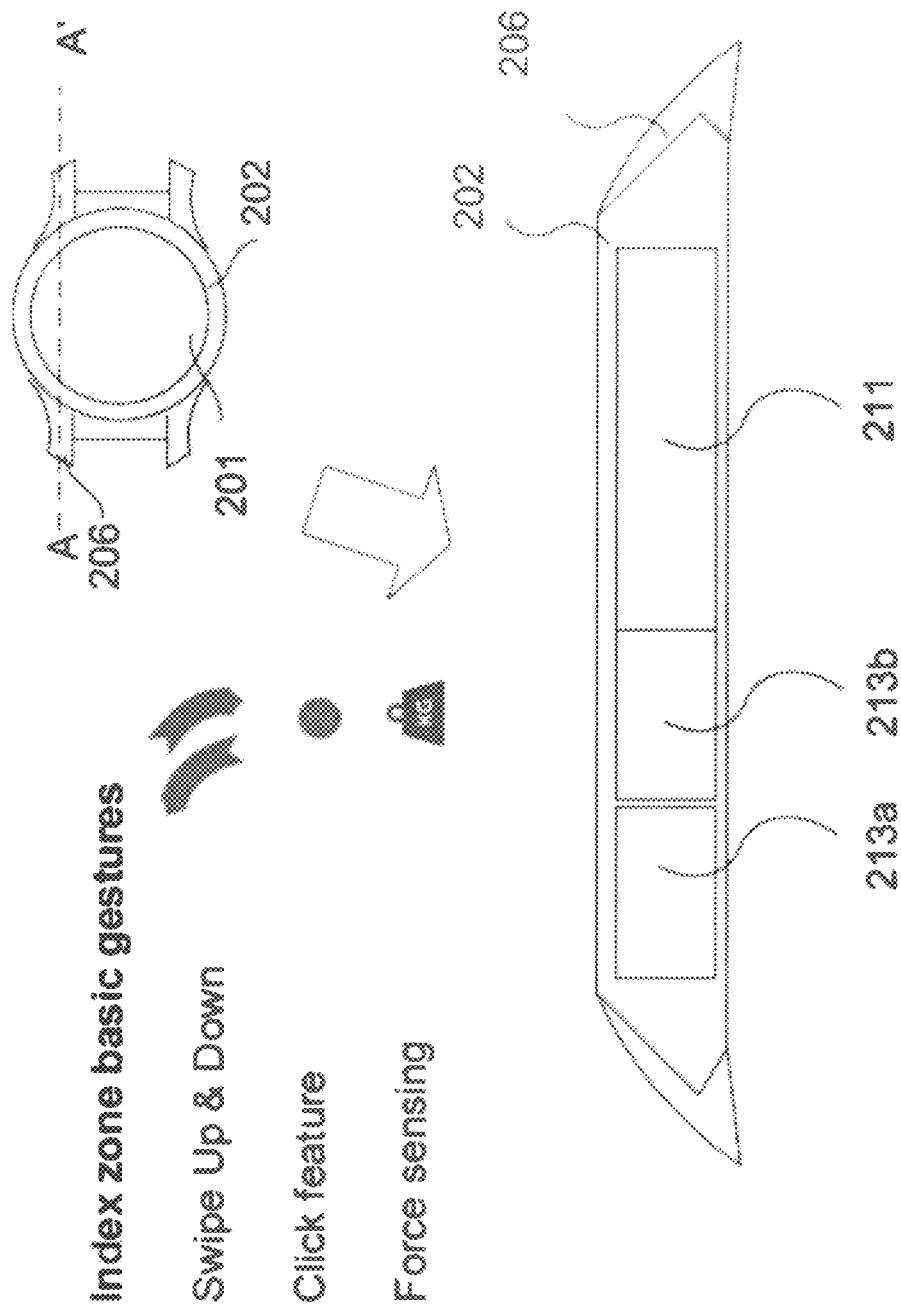

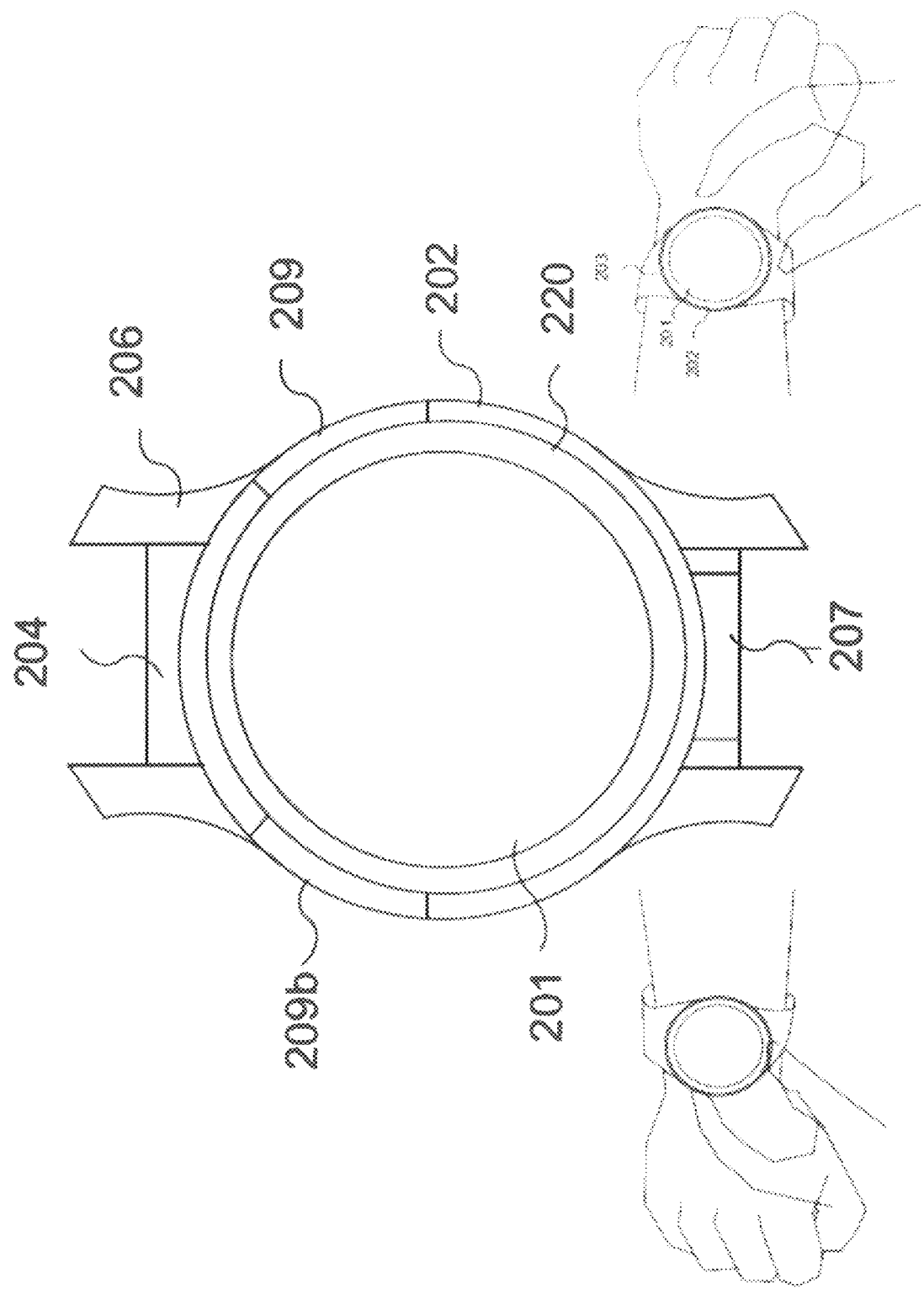

| Watch Model | Block Screen | Water Compatible | Advanced Gesture | Set of Interaction | Click Support | Mechanical/Design Impact |
|---|---|---|---|---|---|---|
| Touch panel | YES | NO | Not convenient | Large | YES | LOW |
| Digital Crown | NO | YES | NO | LIMITED | YES | MEDIUM |
| Rotating Bezel | NO | YES | NO | LIMITED | NO | STRONG |
| Buttons | NO | YES | NO | LIMITED | YES | MEDIUM |
| Thumb & Index Touch | NO | YES | YES | LARGE | YES | LOW |

*FIG. 9*

WEARABLE ELECTRONIC DEVICE HAVING MULTIPLE TOUCH SENSITIVE AREAS OUTSIDE OF VIEWABLE DISPLAY AREA

CROSS-REFERENCE TO RELATED APPLICATION

This application is a U.S. National Stage of International Patent Application No. PCT/EP2016/065670 filed on Jul. 4, 2016, which is hereby incorporated by reference in its entirety.

TECHNICAL FIELD

The following disclosure generally relates to an electronic device, and in particular to a wearable electronic device, such as a smart watch.

BACKGROUND

Compared to a traditional watch, a smart watch brings additional features such as incoming call notifications, activity tracking, pushing mails or short message service (SMS) messages in addition of displaying time. It can interact with a distant application and display useful information to the user through a panel such as displaying a weather forecast, a caller name photo, instructions of a navigation application, or a map. It can also run local applications related to time (e.g. clock, stopwatch, alarm), health (e.g. activity tracker, step counter, heart rate monitor) that leverage local sensors (e.g. accelerometer, gyroscope, heart rate sensor) and actuators (e.g. vibrator, display).

The need of offering intuitive and convenient user inputs is a key element for these new devices to facilitate human machine interaction. For example, such devices can be controlled by buttons, voice commands, a touch panel, a digital crown (e.g. APPLE WATCH), a rotating bezel (e.g. SAMSUNG GEAR S2), or any combination of these means.

A smart watch may have a small display area and have restrictions in input indicating to perform a function. Therefore, technology of detecting input indicating to perform a function of a smart watch is required.

SUMMARY

It is an object of the disclosure to provide an electronic device comprising touch sensitive areas, more particular a smart watch comprising touch sensitive areas.

The foregoing and other objects are achieved by the subject matter of the independent claims. Further implementation forms are apparent from the dependent claims, the description and the figures.

According to a first aspect, an electronic device is provided. The electronic device includes a housing, a display, a first touch sensitive area, a second touch sensitive area, and a processor. The display is coupled with the housing and has a viewable area for presenting visual information. The processor is disposed within the housing and is coupled with the display, and the touch sensitive areas. Both touch sensitive areas are disposed outside of the viewable area of the display, and both touch sensitive areas are supporting sliding gesture detection.

Due to the fact that these touch sensitive areas disposed outside of the viewable area of the display, the display is visible during operation on these areas. Mechanical design impact is low, and supporting of sliding gesture detection by both touch sensitive areas, sophisticated user interface (UI) design can be introduced. Optionally, the electronic device is a smart watch. Optionally, the display is a touchscreen. Optionally, the touch sensitive area(s) is kept away from the display, i.e. being no part of the display. Optionally, the touch sensitive area(s) is disposed beneath a frame of the housing.

In a first possible implementation form of the electronic device according to the first aspect, the first/second touch sensitive area includes one or more than one touch sensitive zones.

With multiple zones introduced, user friendly design is introduced, supporting thus different user's wearing habits, e.g. right-handed vs left-handed.

In a second possible implementation form of the electronic device according to the first aspect as such or according to the first implementation form thereof, the first/second touch sensitive area may be disposed on/in the housing, and/or on/in a band. The band is attached to the housing and configured to secure the electronic device to a user.

With optional position(s) introduced to place the touch sensitive area(s), user friendly design is introduced to increase the potential of maximizing user satisfaction. With the touch sensitive area(s) disposed in/beneath the housing/band, waterproofness can be enhanced.

In a third possible implementation form of the electronic device according to the first aspect as such or according to any one of the preceding implementation forms thereof, the first/second touch sensitive area(s) may be pressure sensitive, and/or fingerprint sensitive as well.

With the capability of touch sensitive, pressure sensitive, and/or fingerprint sensitive, the touch sensitive area(s) opens the door for introducing sophisticated gesture(s)/gesture combinations into UI design of the electronic device.

In a fourth possible implementation form of the electronic device according to the first aspect as such or according to any one of the preceding implementation forms thereof, the processor is coupled with the first touch sensitive area and the second touch sensitive area via a microprocessor.

The microprocessor may be a separate low power consumption microprocessor. Using a separate microprocessor, a low power consumption mechanism for detecting gesture input is introduced. Optionally, the microprocessor is configured to receive a first input from the first touch sensitive area and a second input from the second touch sensitive area, and send one output to the processor in consideration of both the first input and the second input.

In a fifth possible implementation form of the electronic device according to the first aspect as such or according to any one of the preceding implementation forms thereof, the processor is configured, in response to a first gesture performed on the first touch sensitive area and a second gesture performed on the second touch sensitive area to output instruction of providing feedback to a user.

With feedback provided to the user, user friendly design is introduced. Optionally, the feedback includes but is not limited to at least one of or any combination of visual information presented in the viewable area of the display (e.g. Zoom in/out a picture, opening/closing a mobile application), vibration of the electronic device, illumination of the display, locking/unlocking of the display, power on/off of the electronic device, picking up/hanging off a telephone call, connection/disconnection of a wireless communication connection, dialing an emergency call (e.g. 911, 110), voice of an intelligent personal assistant (e.g. SRI of IOS). Optionally, the aforementioned feedback can happen in a remote wireless terminal device (e.g. a mobile phone, a smart TV, a smart home appliance) connected with the electronic device. Thus the electronic device may function as a remote controller, and rich interaction with the user is provided via the wireless terminal device.

According to a second aspect of the disclosure, a method is provided for the electronic device aforementioned. The method includes receiving a first gesture performed on a first touch sensitive area of the electronic device, receive a second gesture performed on a second touch sensitive area of the electronic device, and in response, provide feedback in consideration of both the first gesture and the second gesture. Possible gestures for the first/second gesture can be referred to FIG. 2E, FIG. 4E, and FIG. 5B. Possible combined gesture interpretation of both the first gesture and the second gesture can be referred to FIG. 2E, FIG. 4E, and FIG. 5B. The feedback provided can be based on the possible combined gesture interpretation.

According to a third aspect of the disclosure, a method is provided for operating the electronic device aforementioned. The method includes receiving a first gesture performed on the first touch sensitive area of the electronic device, receive a second gesture performed on the second touch sensitive area of the electronic device, interpret the first gesture, interpret the second gesture, and in response, provide feedback in consideration of both the first gesture and the second gesture. Possible gestures for the first/second gesture can be referred to FIG. 2E, FIG. 4E, and FIG. 5B.

According to a fourth aspect of the disclosure, a method is provided for operating the electronic device aforementioned. The method includes receiving a first gesture performed on the first touch sensitive area of the electronic device, receive a second gesture performed on the second touch sensitive area of the electronic device, interpret a combined gesture in consideration of both the first gesture and the second gesture, and in response, provide feedback based on the combined gesture. Possible gestures for the first/second gesture, and possible combined gestures can be referred to FIG. 2E, FIG. 4E, and FIG. 5B.

According to a fifth aspect of the disclosure, an electronic device is provided to include corresponding means for carrying out the method(s) aforementioned.

According to a sixth aspect of the disclosure, a computer program product is provided. The computer program product is adapted to perform the method(s) aforementioned.

According to a seventh aspect of the disclosure, a computer program comprising software code is provided. The computer program is adapted to perform the method(s) aforementioned.

According to an eighth aspect of the disclosure, a computer readable storage medium comprising the computer program aforementioned is provided.

According to a ninth aspect of the disclosure, a computer readable storage medium comprising instructions to cause an electronic device aforementioned to carry out method(s) aforementioned is provided.

In aforementioned aspects of the disclosure, particularly the method(s), a first gesture performed on a first touch sensitive area and a second gesture performed on a second touch sensitive area may be performed on the electronic device substantially at the same time, or be detected by the electronic device substantially at the same time. The electronic device can thus consider both gestures altogether and then provide a single feedback to a user.

BRIEF DESCRIPTION OF DRAWINGS

Further embodiments of the disclosure will be described with respect to the following figures, in which:

FIG. 2B shows a cut view of part of the example wearable electronic device of FIG. 2A;

FIG. 3A shows another example wearable electronic device;

FIG. 9 provides a table showing advantages of the Thumb & Index Touch solution provided by this disclosure over conventional arts.

In the figures identical reference signs are used for identical or at least functionally equivalent features.

DESCRIPTION OF EMBODIMENTS

Development of wearable computers is accelerating with advances in technology. Wearable computers refer to computers that a user may naturally wear like clothes, watches, glasses, and accessories. Smartphones or tablet personal computers (PCs) may be easily manipulated with fingers or a touch pen but may be inconvenient because they should be carried in a pocket or bag or be held in the hand. On the other hand, wearable computers may achieve better portability than smartphones or tablet PCs because they can be worn around the wrist or worn like glasses. Further, as an example of a wearable computer, a wristwatch-type mobile device, i.e., a smart watch, capable of wirelessly using various services such as a diary, messages, notifications, and stock quotations has appeared in the form of a variety of products. A smart watch is a wearable electronic device.

It is contemplated that a plurality of tactile zones/parts of the present disclosure can be employed to enrich UI design for a wearable electronic device. For embodiments of this disclosure, a wearable electronic device may be a watch, portable music player, health monitoring device, computing or gaming device, smart phone, or the like. In some embodiments, the wearable electronic device is a smart watch that can be worn around the wrist of a user.

In the following detailed description, reference is made to the accompanying drawings, which form a part of the disclosure, and in which are shown, by way of illustration, specific aspects in which the present disclosure may be practiced. It is understood that other aspects may be utilized and structural or logical changes may be made without departing from the scope of the present disclosure. The following detailed description, therefore, is not to be taken in a limiting sense, as the scope of the present disclosure is defined by the appended claims.

For instance, it is understood that a disclosure in connection with a described method may also hold true for a corresponding device or system configured to perform the method and vice versa. For example, if a specific method step is described, a corresponding device may include a unit to perform the described method step or corresponding function, even if such unit is not explicitly described or illustrated in the figures, and vice versa. Further, a person skilled in the art would appreciate that the features of the various exemplary aspects described herein may be combined with each other, unless noted otherwise.

Figure 1:
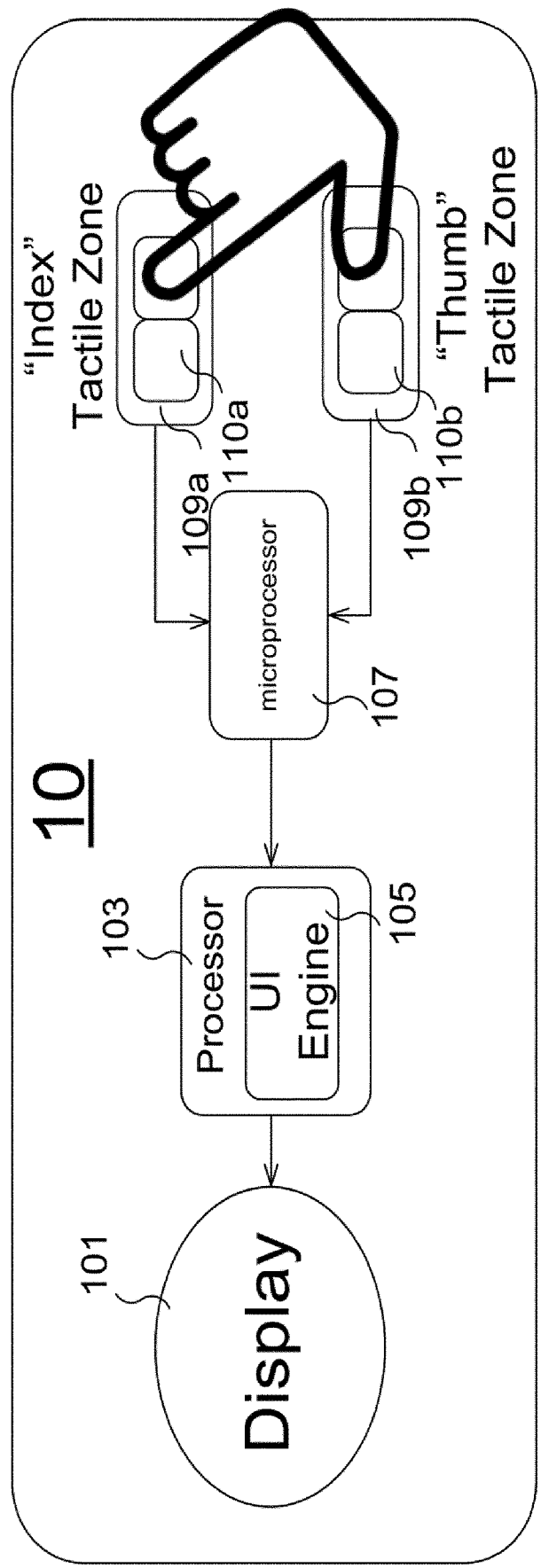
FIG. 1 shows an example schematic diagram of a wearable electronic device according to an embodiment.

FIG. 1 shows an example schematic diagram of a wearable electronic device 10, e.g. a smart watch. The smart watch 10 includes an electronic visual display 101 at least partially disposed within a housing (not shown) of the smart watch 10 and having a viewable area for presenting visual information. The display 101 may be a touchscreen. The smart watch 10 includes a processor 103 configured to operate a UI engine 105 for allowing a user to interact with the smart watch 10. The processor 103 is disposed within the housing of the smart watch 10 and is coupled with the display 101. The UI engine 105 for user interface may be an engine designed for graphic UI (GUI), which may be an object-oriented graphic engine driven by user interface classes and methods. The smart watch 10 at least includes a first tactile area/zone 109a, e.g. active "index" tactile zone, and a second tactile area/zone 109b, e.g. active "thumb" tactile zone. Each zone may have one or more touch sensitive parts 110a, 110b. In some embodiments of this disclosure, each touch sensitive part may be a touchpad, such as resistive sensor being able to sense the position of the user's finger, or a touch sensor related part, such as a capacitive/piezoresistive/pressure-sensitive part being able to sense the touch of the user's finger possibly with a pressure. Preferably, low power touch sensitive solution is implemented.

In this embodiment, the smart watch 10 includes at least two tactile areas/zones 109a, 109b. These two areas/zones are located outside the display area, i.e. not blocking viewable area of the display. The areas/zones can be reached by two fingers (preferably the index finger and the thumb finger) at substantially the same time. Each area/zone is at least capable of sensing a sliding gesture, e.g. swipe left/right and/or swipe up/down, a simple touch, e.g. click, and optionally, pressure (e.g. z-touch). These tactile areas/zones can coexist with the classical user watch inputs, e.g. buttons and a touch panel.

The smart watch 10 may also have a microprocessor 107 that can detect a single event, e.g. touch, sliding/swipe, press, on each area/zone, and can possibly combine them to form and offer advanced gesture patterns, e.g. zoom in/out, rotate. Preferably, a low power microprocessor is used for coupling with each tactile area/zone and the processor. A person skilled in the art would appreciate that the microprocessor 107 can be integrated within the processor 103. An example of the microprocessor 107 is a sensor hub. One example form of the sensor hub may be referred to a sub-processor as recited in patent application US20140059365A1, which is incorporated herein by reference. A person skilled in the art would appreciate that logic of algorithms described in patent application US20140059365A1 regarding interaction among interrupt sensor, sub-processor and main processor is well suited for application in implementing interaction among sensor sensitive area, microprocessor and processor of this disclosure. Those algorithms and logic thereof are incorporated herein by reference. A person skilled in the art would appreciated that necessary change may adopted when logic of those algorithms are applied in implementing interaction among sensor sensitive area, microprocessor and processor of this disclosure.

Due to the tactile areas/zones 109a and 109b which are disposed outside of viewable area of the display 101, the smart watch 10 allows to offer a convenient, natural and ease of use user input, an visible screen during most of the time when user interact with the smart watch, and a large set of interaction from a simple touch (e.g. a click) to advanced gestures related to the combination of events. In some embodiments, the tactile areas/zones 109a and 109b are disposed beneath the watch frame which improves waterproofness of the watch. In some embodiments, the tactile areas/zones 109a and 109b can be disposed on the watch frame, e.g. the areas/zones can be directly printed on the watch frame and hidden behind a decorative part.

Edge & Inter Lug Embodiment

Figure 2A:
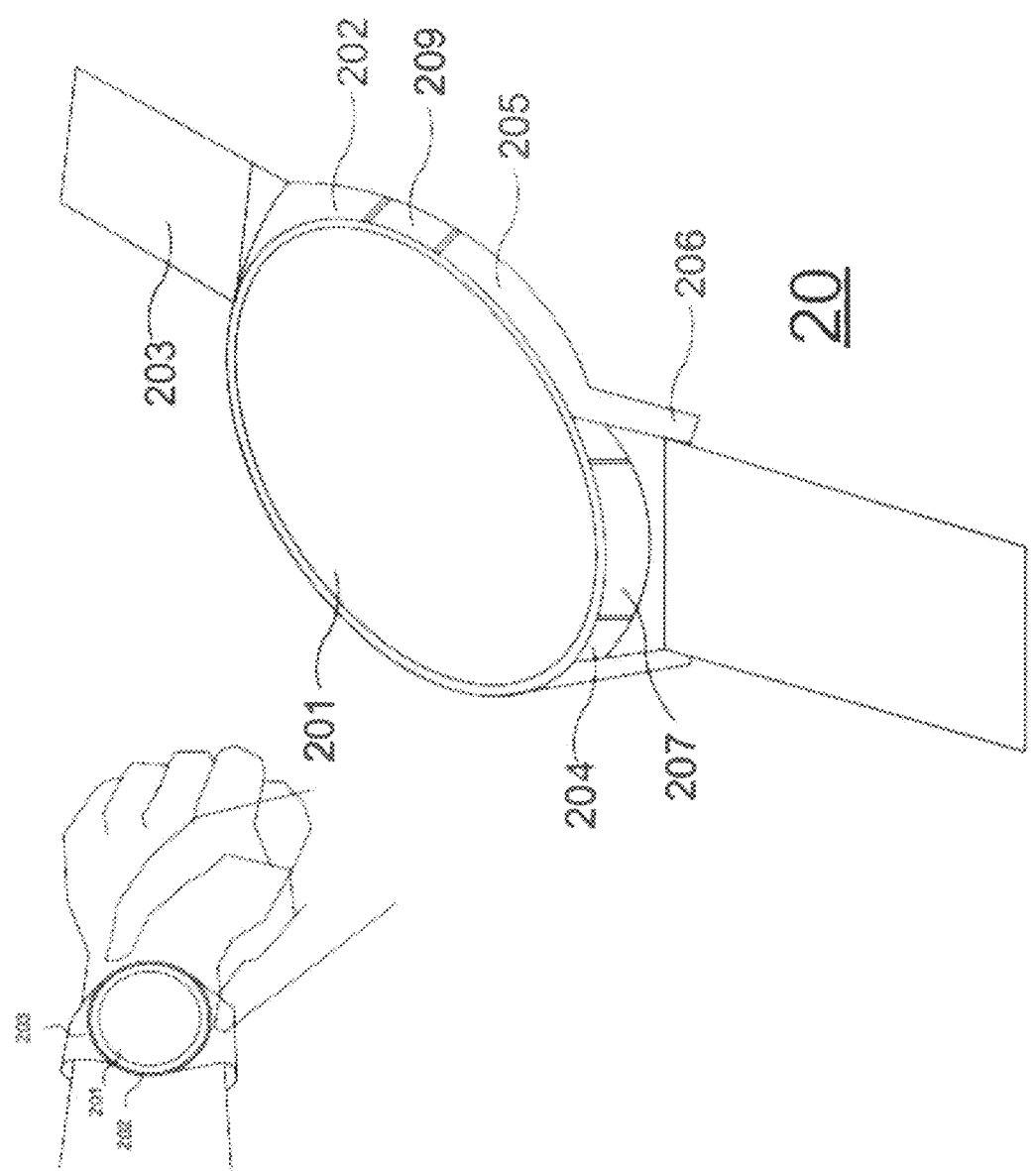
FIG. 2A shows an example wearable electronic device.

FIG. 2A shows an example wearable electronic device (e.g. smart watch) having a device body and a band. The smart watch 20 includes a touchscreen 201, a device body/watch frame/housing 202, and a band 203.

In this embodiment, an index tactile zone 209 is disposed on an edge 205 of the watch frame. The index tactile zone 209 may be disposed between the upper right lug/horn (not shown) of the smart watch 20 and the center of the edge 205 (preferably above a crown if any). A thumb tactile zone 207 is disposed on the lower inter horn area 204 of the watch frame 202, which is between the lower lugs/horns 206 of the smart watch 20. The position of these two zones offers a natural, intuitive and comfortable index and thumb placement. These two zones may be disposed on the surface of the watch frame, or beneath the watch frame.

FIG. 2B shows a cut view (A-A') how the index tactile zone could be placed within a watch frame of the example wearable electronic device shown in FIG. 2A. The tactile zones/sensor(s) 213a, 213b can be placed on the inner edge 211 of the watch frame 202 to minimize design impact. There can be no opening on the watch frame 202. Waterproofness is therefore enhanced. Several possible material for the watch frame like stainless steel, plastic, aluminum, or ceramic may be used. Several technologies can be envisaged for suitable touch sensitive sensors force touch (i.e., force sensing) sensor based on nanoparticles (e.g. solutions provided by Peratech Holdco Limited, or NANOMADE-CONCEPT SAS), metal over cap technology (e.g. solutions provided by Microchip technology, or TEXAS INSTRUMENT), simple self capacitive sensor, and piezoresistive sensor (e.g. solutions provided by Uneo Technology or PIEZOTECH). In this implementation example, the index tactile zone includes 2 distinct active areas that allows to support some basic gestures/patterns slide down, slide up, click (i.e. simple touch) or pressure sensitive touch (i.e. force touch, force sensing). One example dimension of the index tactile zone (213*a*+213*b*) can be 10 millimeters (mm) long, 4.2 mm wide, and less than 1 mm thick. Material applied on the tactile zones/sensor(s) may be 1 mm thick, or 0.5 mm thick with local extrusion.

Figure 2C:
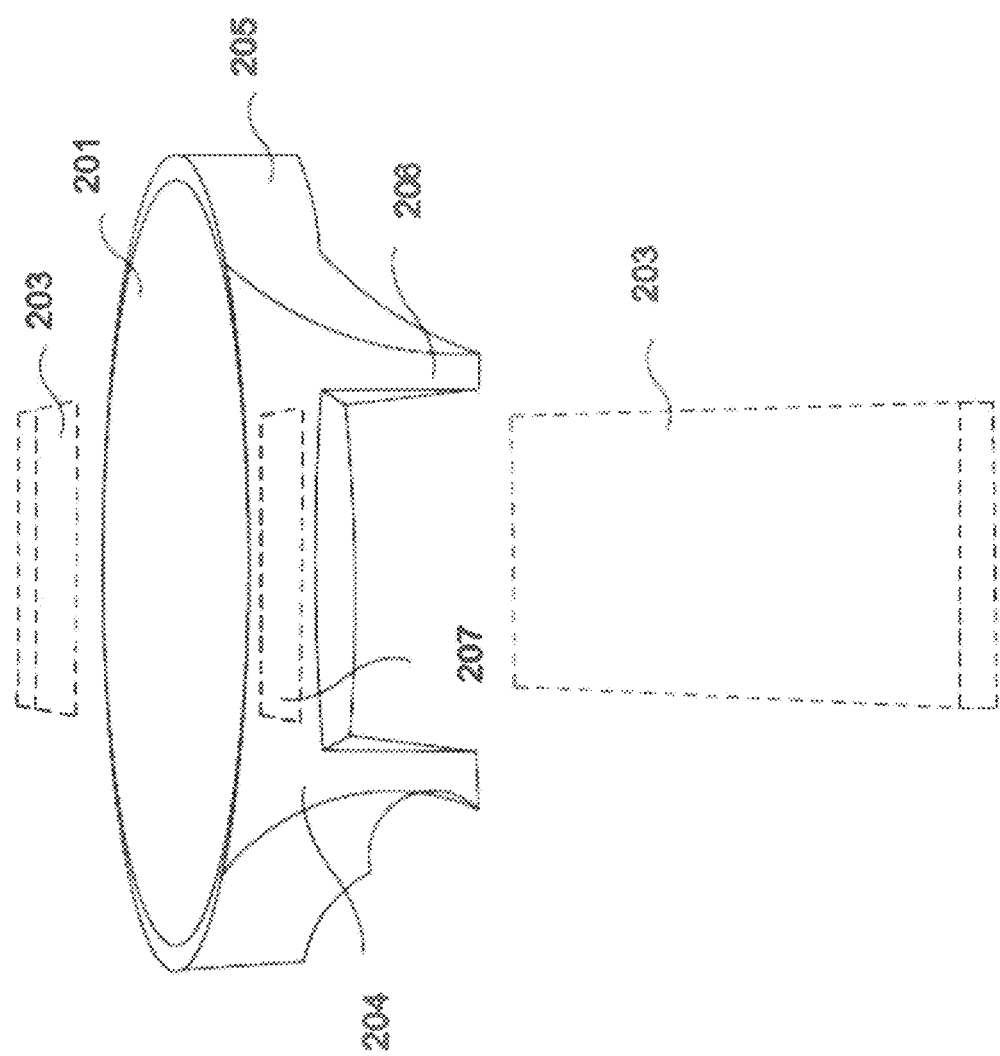
FIG. 2C shows another view of the example wearable electronic device of FIG. 2A.

FIG. 2C shows another view of the example wearable electronic device shown in FIG. 2A. A thumb tactile zone 207 is disposed on the lower inter horn area 204 of the watch frame, which is between the lower lugs/horns 206 of the watch.

Figure 2D:
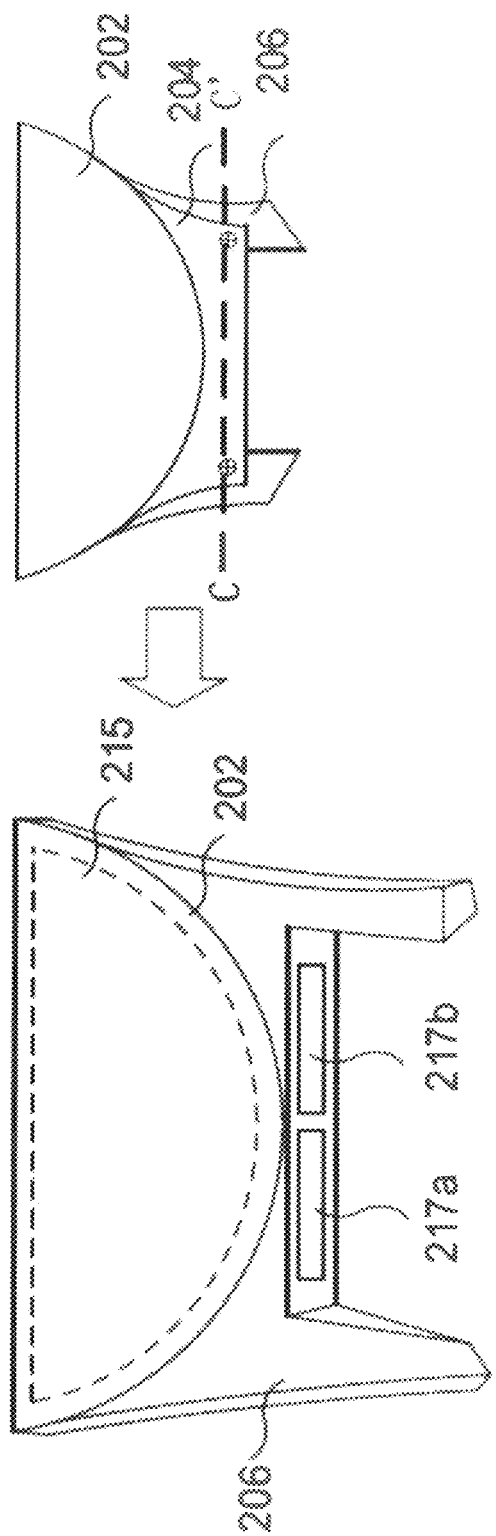
FIG. 2D shows another cut view of part of the example wearable electronic device of FIG. 2A.

FIG. 2D shows a cut view (C-C') how the thumb tactile zone could be placed beneath a watch frame of the example wearable electronic device shown in FIG. 2A. Right corner part of FIG. 2D shows the lower inter horn area 204 of the watch frame viewed from bottom of the watch. Left cut view from watch bottom shows how the thumb tactile zone 207 can be implemented beneath the watch frame 202, e.g. inner wall of inter lug/horn area of the watch frame 202. The thumb tactile zone 207 can also include two active areas 217*a*, 217*b* that allow to support basic gestures/patterns slide left, slide right, click (i.e. simple touch) or pressure sensitive touch (i.e. force touch, force sensing). Processor and/or microprocessor aforementioned is disposed within the inner space 215 of the device body. Aforementioned mechanism for index tactile zone can be applied for thumb tactile zone as well, though dimension may vary. One example dimension of the thumb tactile zone (217*a*+217*b*) can be 15 mm long, 2.5 mm wide, and less than 1 mm thick. Material applied on the zones/tactile sensor(s) may be 1 mm thick, or 0.5 mm thick with local extrusion.

Figure 2E:
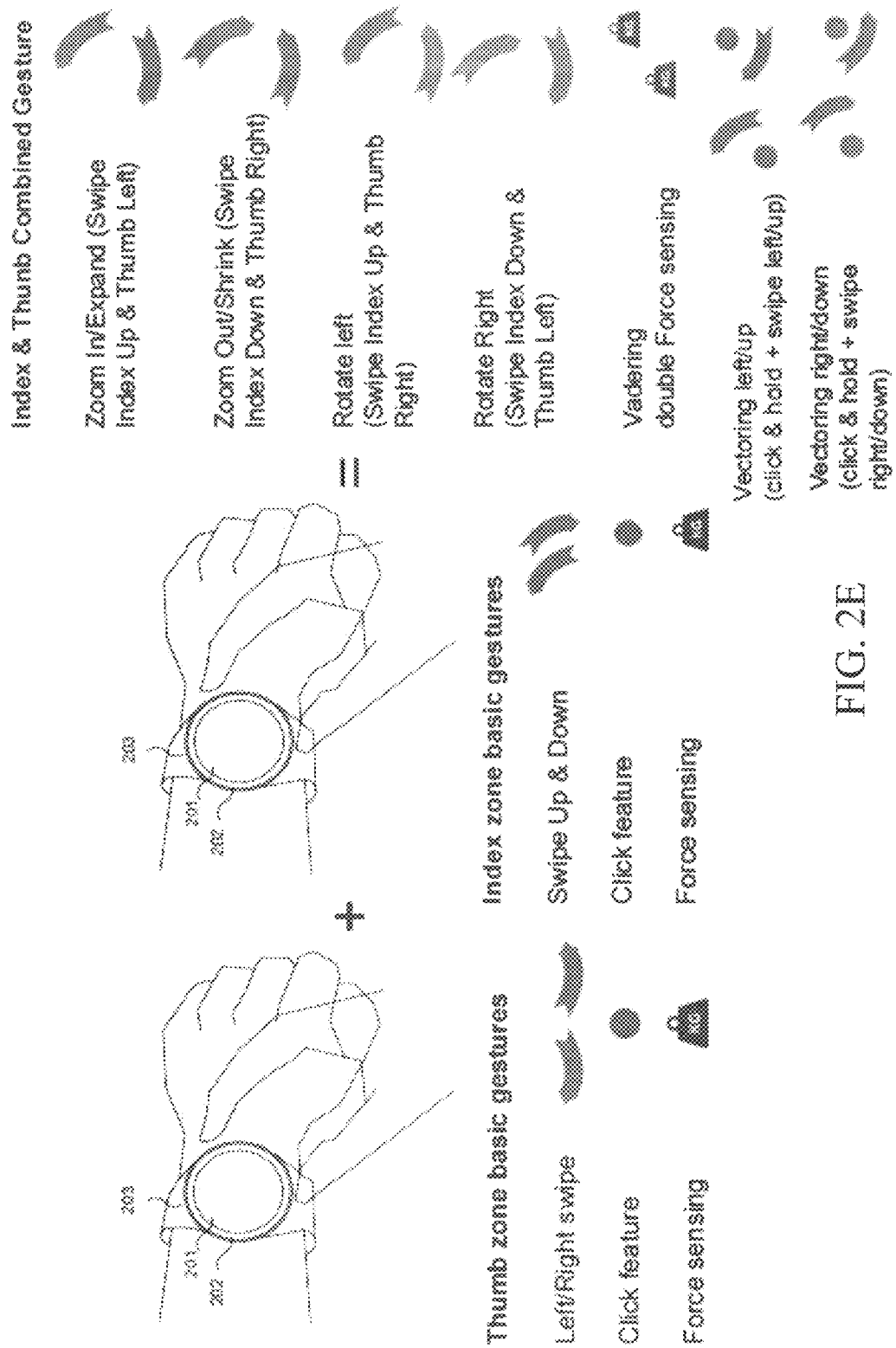
FIG. 2E shows examples of combining basic gestures from different tactile zones to form advanced gestures for the wearable electronic device of FIGS. 2A-2D.

FIG. 2E shows examples of combining basic gestures from different tactile zones to form advanced gestures. User friendly design can be achieved when basic gestures are combined together to offer advanced and sophisticated gestures. For example, a slide left with thumb+a slide up with index can form a zoom in/expand feature in implementation, a vectoring left/up gesture (e.g. thumb finger click & hold while index finger swipe up) can form a zoom in/expand feature in implementation. A person skilled in the art would appreciate that any possible combination can be exploited and a rich set of gestures can be offered. FIG. 2E shows some possible advanced gestures based on the combination of the two tactile zones. Implementation of this embodiment may be carried out by the processor and/or microprocessor with necessary algorithm(s) involved. For example, the processor receives signals from tactile zones, and interprets the corresponding gesture(s). Alternatively, the microprocessor receives signal(s) from tactile zone(s), interprets the corresponding instruction(s) (e.g. a single basic gesture input, or a combined gesture input), and sends corresponding instruction(s) to the processor.

FIG. 3A shows another example wearable electronic device. This embodiment is similar to FIG. 2A. The difference is that FIG. 3A adds one or more index tactile zone(s) 209*b* to further support left-handed users. This left hand supportive embodiment is a first variant that enriches the Edge & Inter lug basic implementation aforementioned. The idea is to offer an alternative index tactile zone for left-handed person that can wear watch on their right arm. In this context, three zones are implemented within the watch frame 202 right handed index zone 209, left handed index zone 209*b*, and common thumb zone 207. A bezel 220 may be introduced as well.

Alternate Thumb Embodiment

Figure 3B:
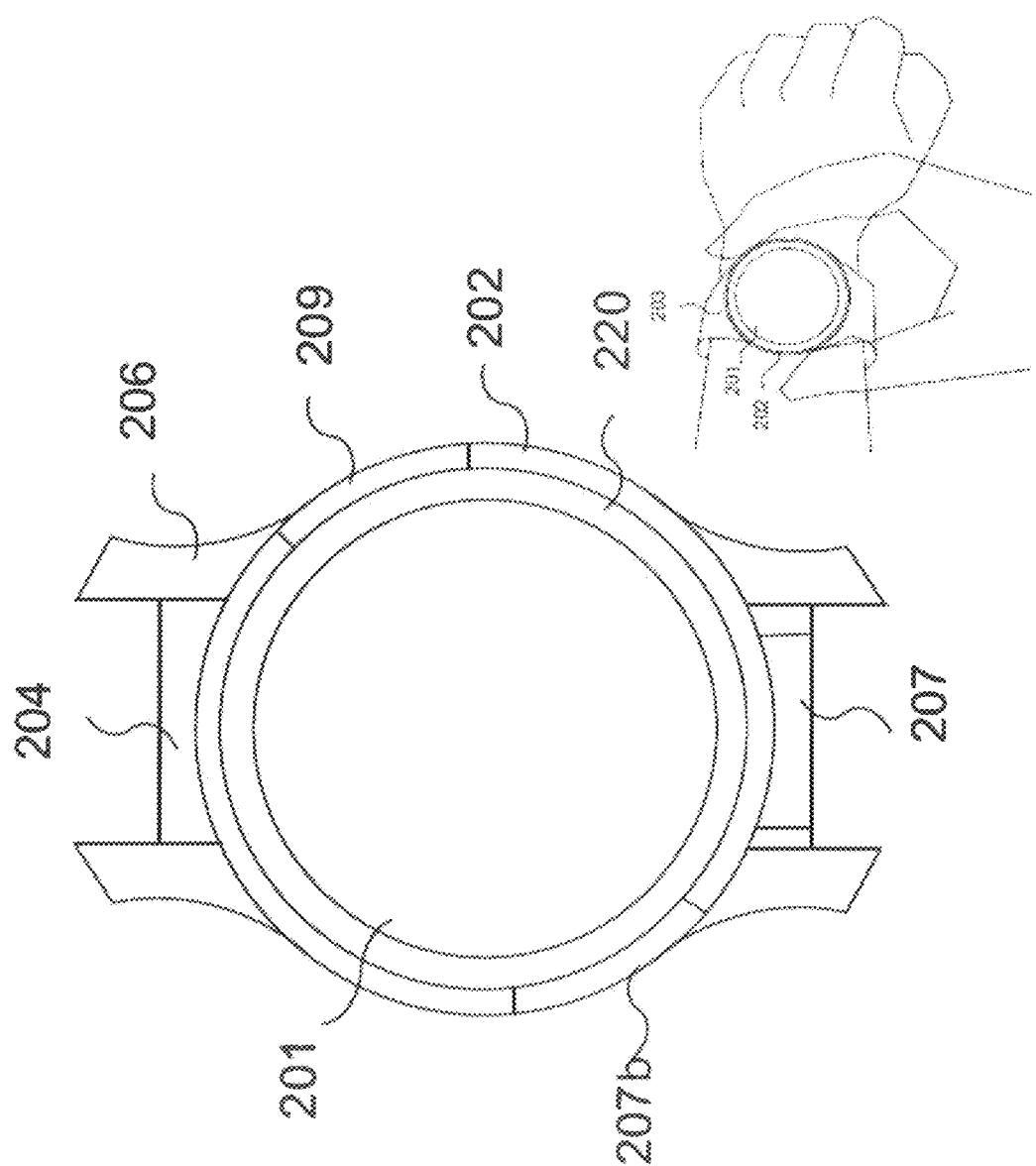
FIG. 3B shows another example wearable electronic device.

FIG. 3B shows another example wearable electronic device. In the same spirit of the left handed embodiment, an alternate thumb tactile zone 207*b* can be added. This new zone can take place in the lower part of the left edge of the watch.

Left Handed with Alternate Thumb Embodiment

Figure 3C:
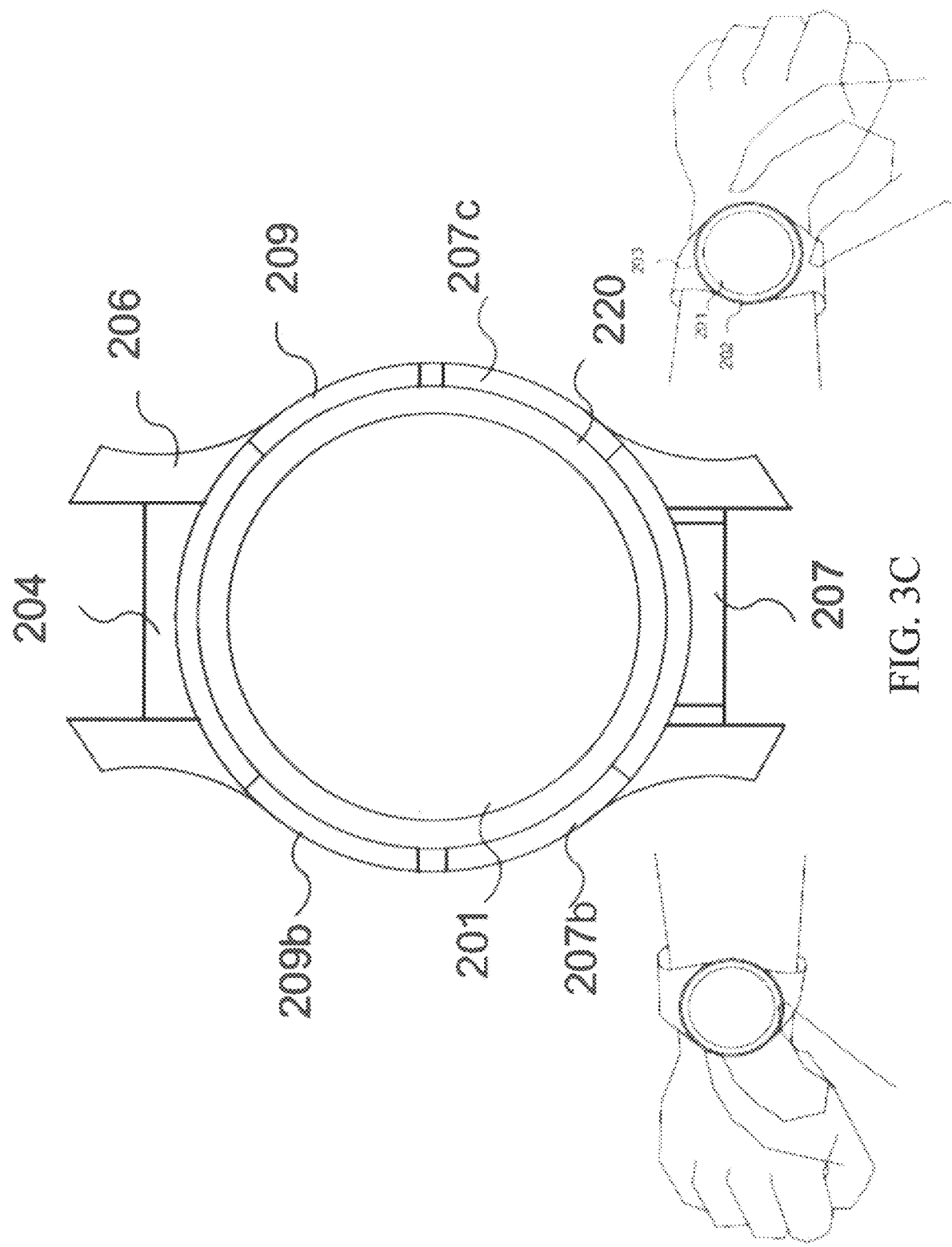
FIG. 3C shows another example wearable electronic device.

FIG. 3C shows another example wearable electronic device. This variant provides a right-handed index tactile zone 209, a left-handed index tactile zone 209*b*, a common thumb tactile zone 207, a right-handed alternative thumb tactile zone 207*b*, and a left-handed alternative thumb tactile zone 207*c*.

Full Ring Embodiment

Figure 3D:
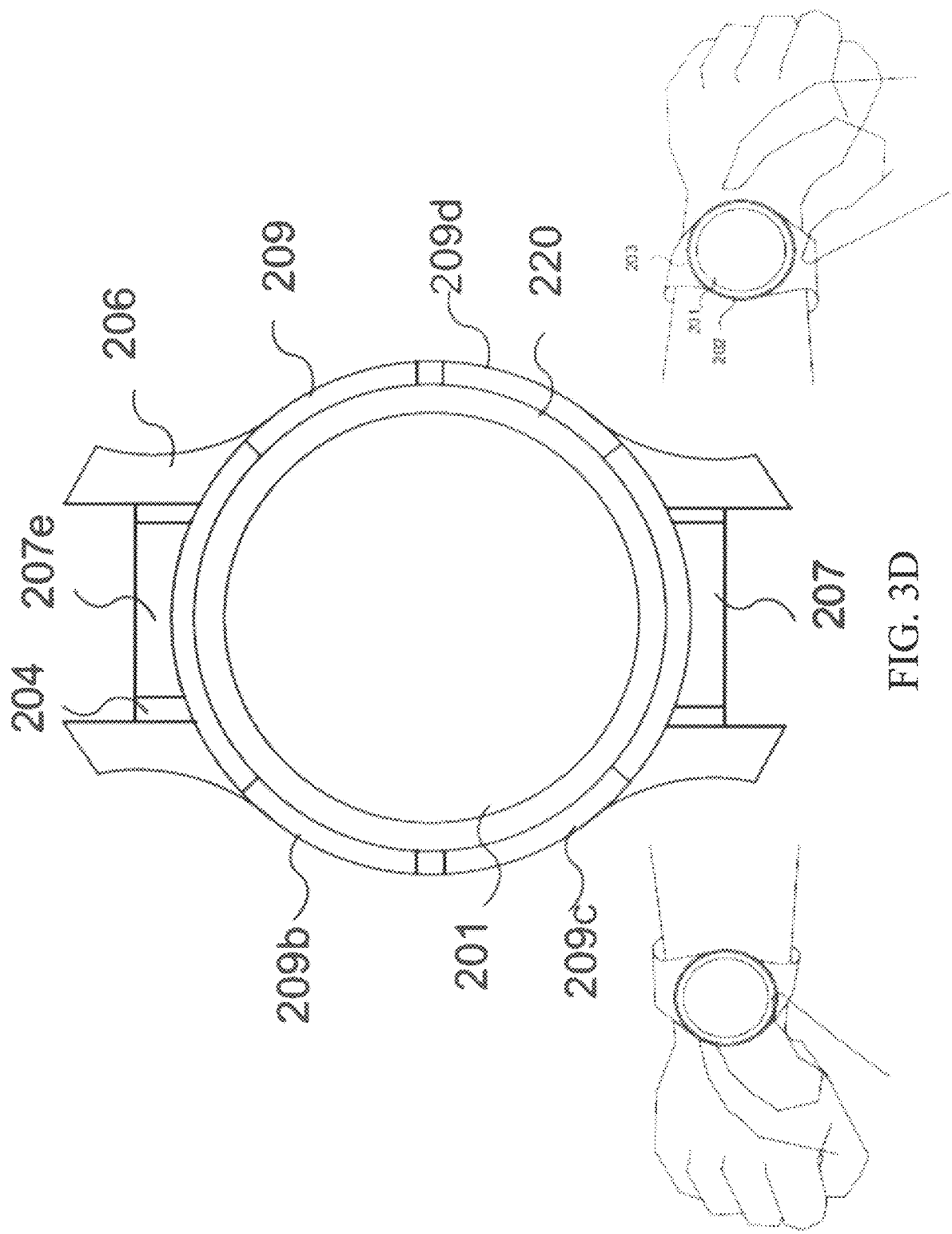
FIG. 3D shows another example wearable electronic device.

FIG. 3D shows another example wearable electronic device. This variant provides a full ring tactile zones index tactile zones 209, 209*b*, 209*c*, 209*d*, and thumb tactile zones 207, 207*e*.

A person skilled in the art would appreciate that more tactile zones can be provided, more advanced gestures and/or gesture combinations can be provided. User friendly UI design is also enriched regardless how a potential user would wear the smart watch.

Bezel Embodiment

Figure 4A:
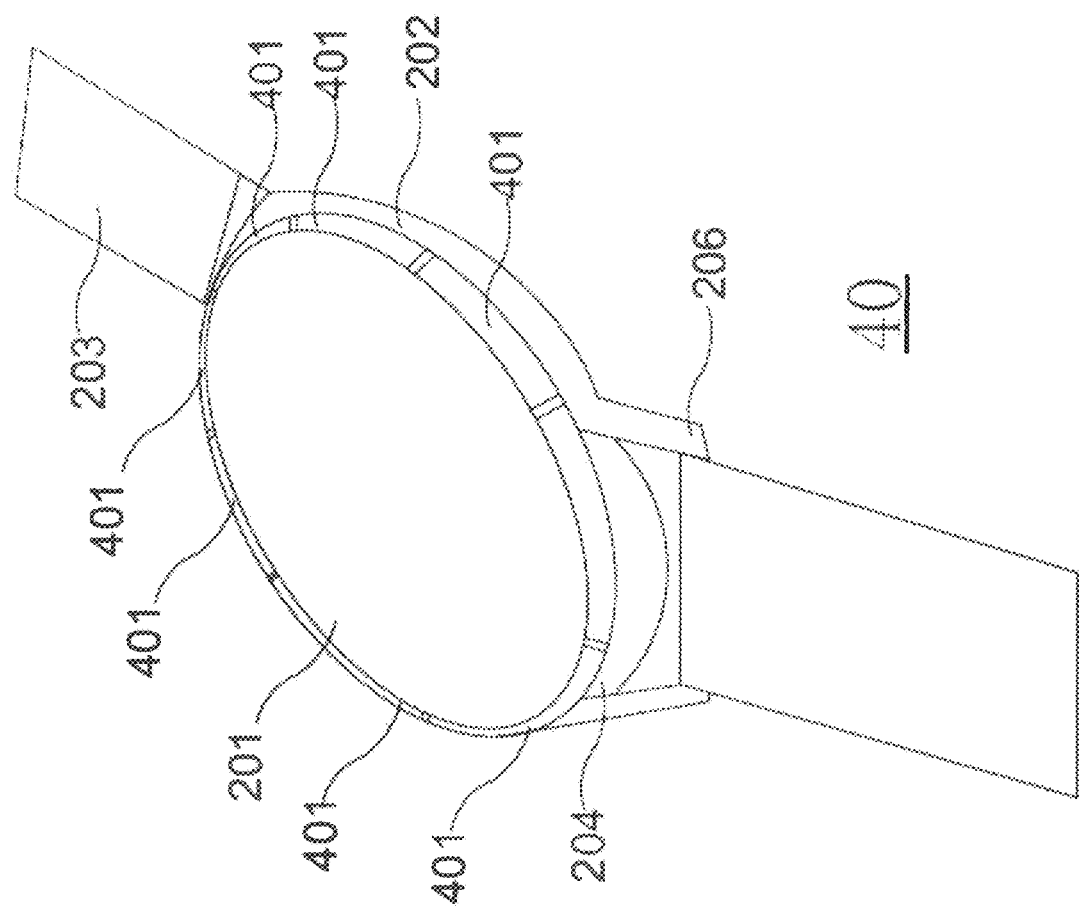
FIG. 4A shows another example wearable electronic device.
Figure 4B:
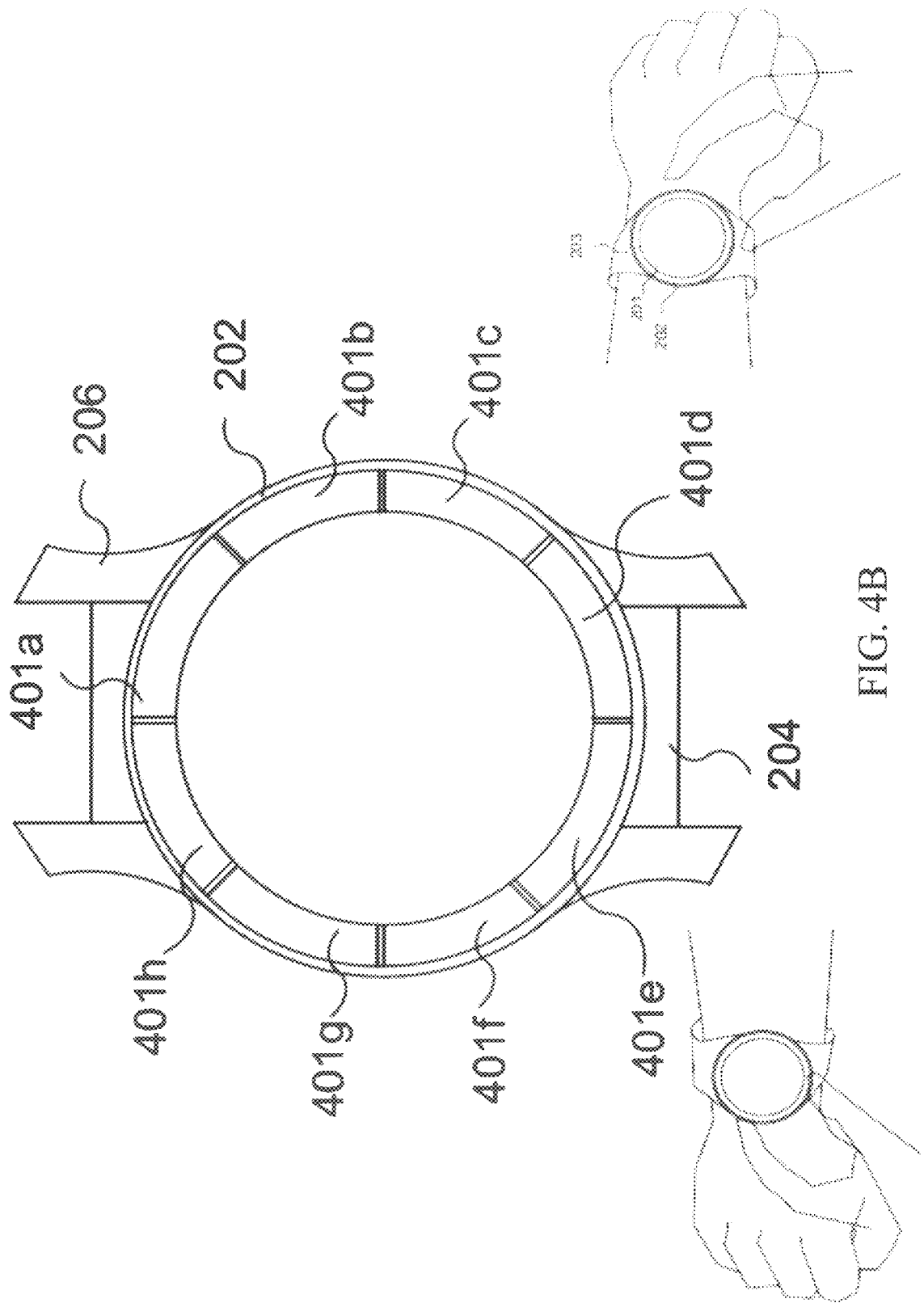
FIG. 4B is a front view of the example wearable electronic device of FIG. 4A.

FIGS. 4A and 4B show another example wearable electronic device (smart watch) 40. Similar to the full ring approach, a variant is to implement such full ring zones in a bezel area instead of on/beneath the watch frame wall. In this embodiment, touchscreen 201 and bezel ring area are beneath glass of the front surface of the watch 40. In another embodiment, bezel ring area may be disposed out of glass area of the front surface of the watch 40. As shown in FIG. 4A, a multi-zone sensor is implemented in the bezel area including a plurality of touch sensitive part 401. A person skilled in the art would appreciate that bezel ring may be disposed surrounding the glass covering the touchscreen. In another embodiment, the full ring zone is disposed on top of the watch frame around or above the glass.

This implementation may propose the same set of gestures of the Edge & Inter Lugs approach based on a plurality of zones and possible combination thereof for example, as shown in FIG. 4B, index tactile zones 401*a*, 401*b*, nominal thumb tactile zones 401*e*, 401*d*, left-handed index tactile zones 401*g*, 401*h*, alternate thumb tactile zones 401*e*, 401*f*, and alternate left-handed thumb tactile zones 401*c*, 401*d*.

Figure 4C:
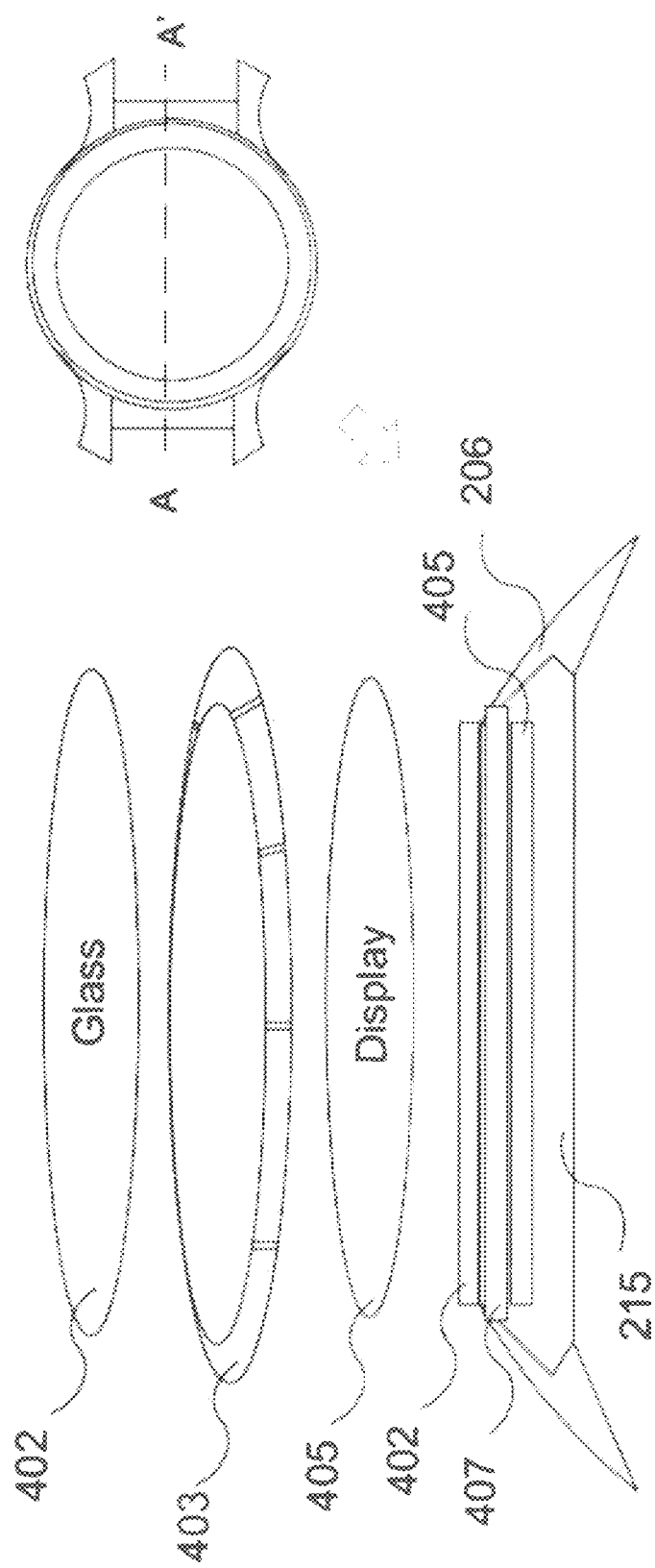
FIG. 4C shows a cut view of part of the example wearable electronic device of FIGS. 4A and 4B.

FIG. 4C shows a cut view of part of the example wearable electronic device of FIGS. 4A and 4B. On the top is a glass/touch panel layer 402. Around or beneath the glass panel layer 402 is bezel 403 including a plurality of tactile zones. A layer of nanomade sensor 407 is beneath the tactile zones of the bezel 403. A display/touchscreen 405 is beneath the glass panel layer 402. Several possible material for the bezel like stainless steel, plastic, aluminum, or ceramic may be used. Aforementioned touch sensitive sensor technologies can be envisaged for suitable tactile sensors. As an embodiment, conventional capacitive touch panel may be replaced and be outclassed by this approach glass+display+ bezel with tactile zones.

Figure 4D:
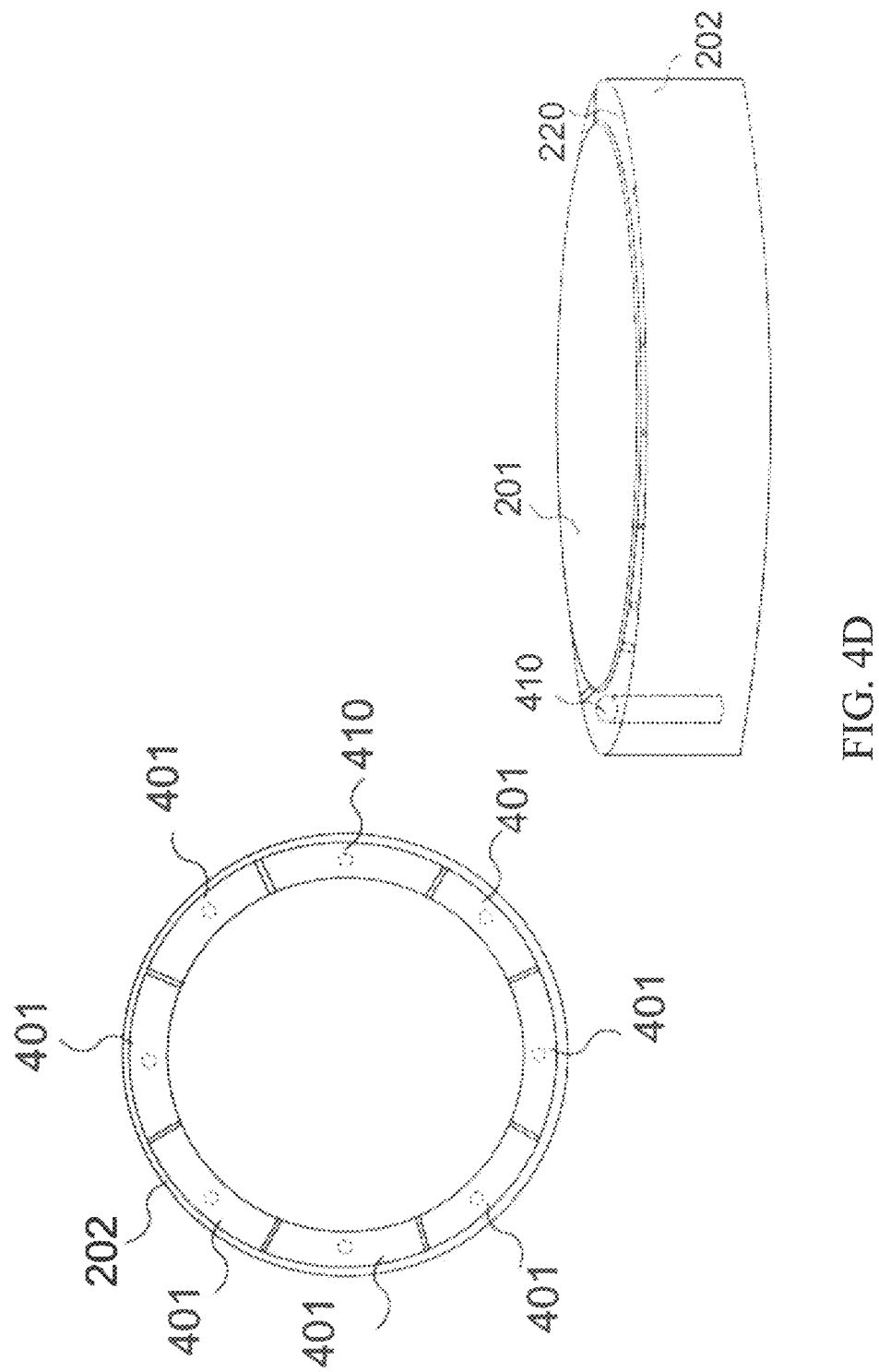
FIG. 4D shows another example wearable electronic device.

FIG. 4D shows another example wearable electronic device. The left above-view figure shows a variant of FIG. 4A. In terms of implementation, beneath tactile zones 401 is a force touch multi zone sensor(s) which can be disposed within the watch frame or directly beneath the bezel (see right side-view figure). Note that in the first option, waterproofness is enforced. In this figure, pointers 410 are showed. Pointers 410 could be a helpful option to concentrate the force on the sensor helping a better detection for each zone. An implementation example of the pointer methodology may be a point element mechanism as described in patent application PCT/EP2015/072757 filed on Oct. 1, 2015, which is originated from one of the inventors of this disclosure, and is hereby incorporated by reference in its entirety.

Figure 4E:
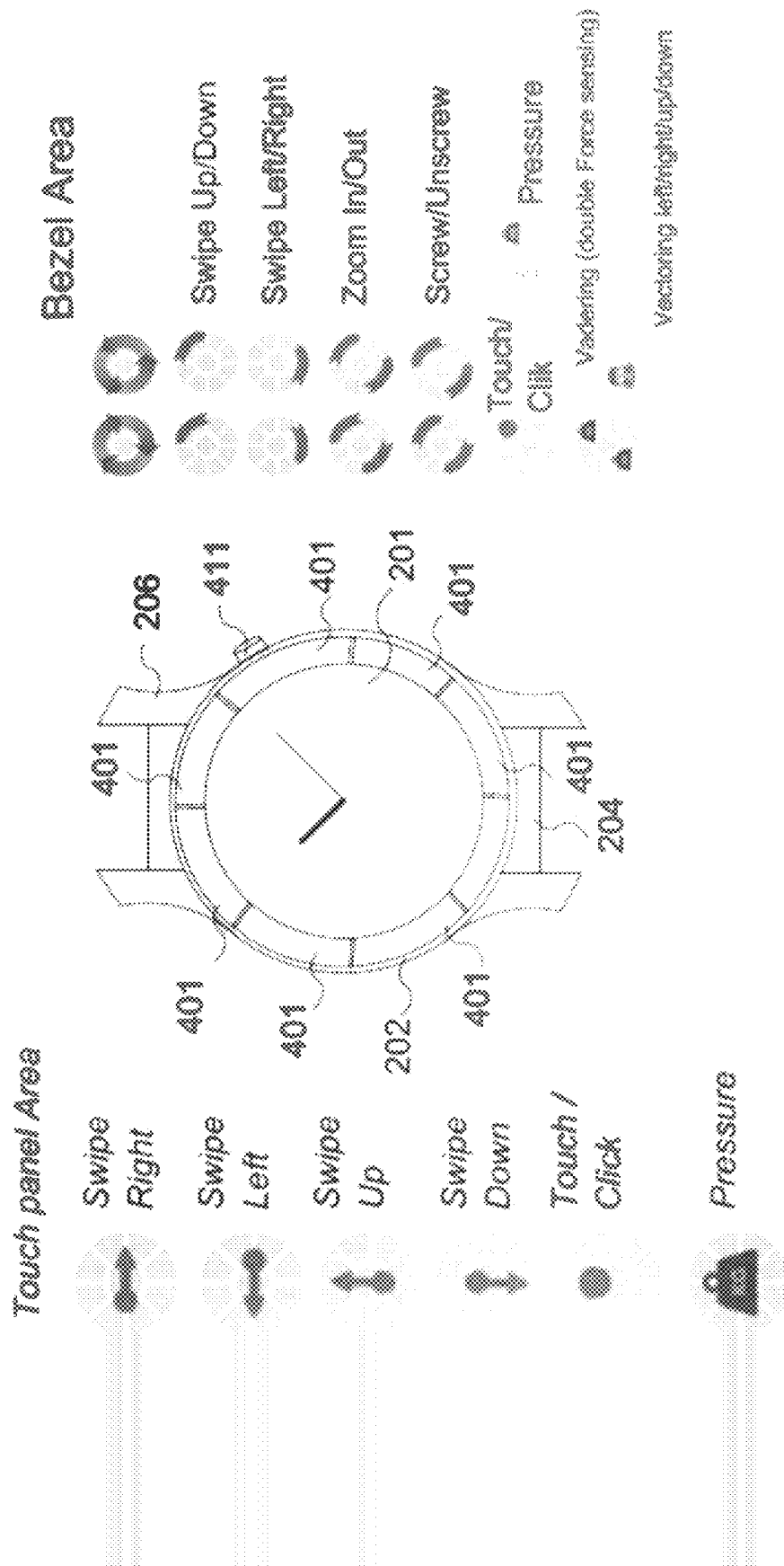
FIG. 4E shows possible gestures supported by the example wearable electronic device of FIGS. 4A-4D.

FIG. 4E shows possible gestures supported by the example wearable electronic device of FIGS. 4A-4D. A person skilled in the art would appreciate that this full ring and quasi "continuous" sensor solution opens the door of new possibilities of gestures and combinations thereof, such as clicking or sliding around the clock. This allows to offer new basic and advanced possible gestures as shown in FIG. 4E. Gestures of FIG. 4E are provided as examples, a person skilled in the art would appreciate more possible ones, e.g. examples provided in FIG. 2E.

Smart Strap/Band Embodiment

Figure 5A:
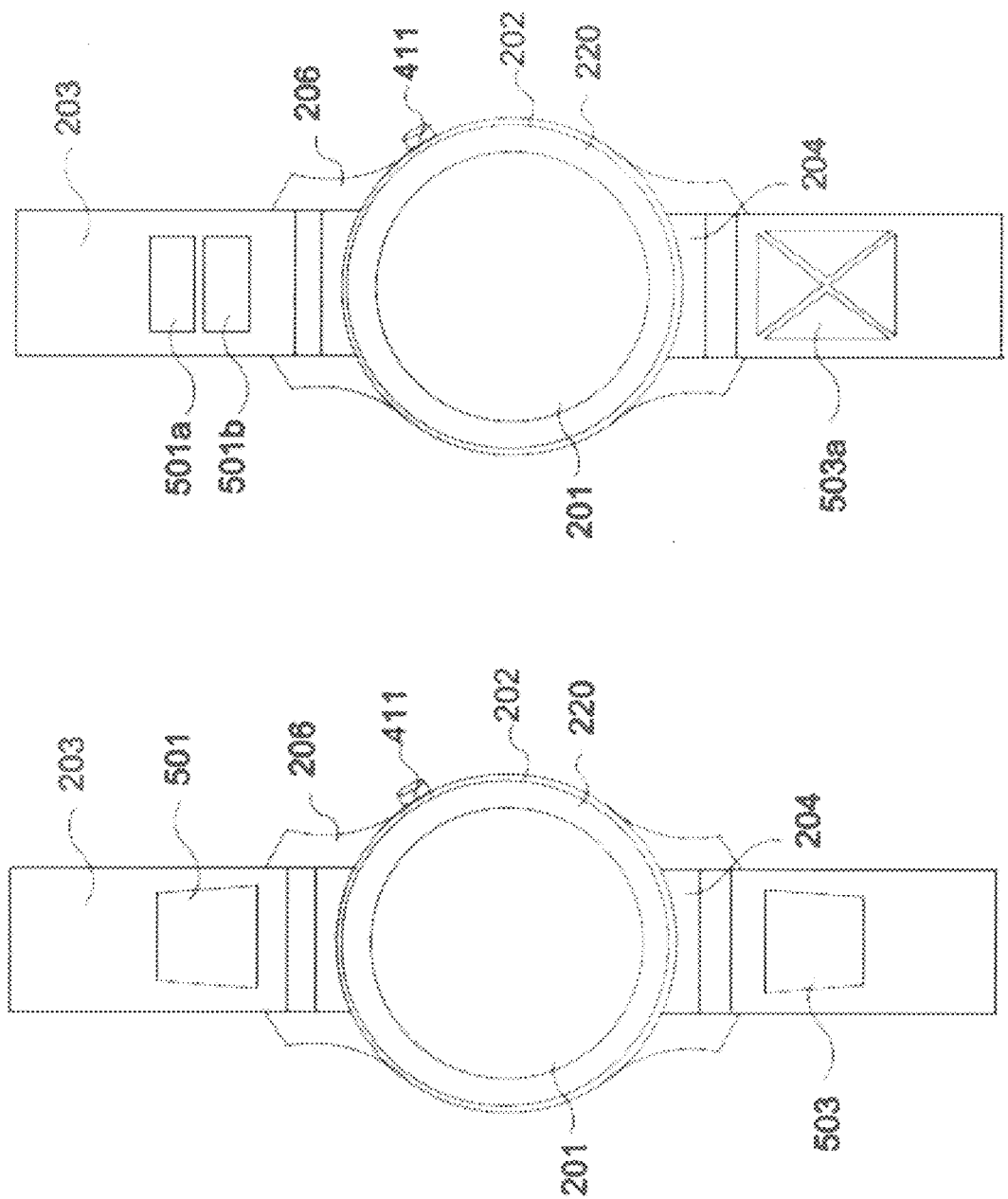
FIG. 5A shows another example wearable electronic device.

FIG. 5A (left figure) shows another example wearable electronic device. This implementation leverages the strap/band of the watch. In this embodiment, the two tactile zones 501, 503 are located on a lower and an upper strap of the watch. The upper part can be dedicated to an index finger as the index tactile zone while the lower one can be dedicated to a thumb finger as the thumb tactile zone. This embodiment may be implemented in combination with aforementioned embodiments as well, i.e. watch frame 202 with tactile zone(s), bezel 220 with tactile zone(s), inter rug/horn area 204 with tactile zone(s), and display 201 with touch panel. The tactile zones preferably uses Nanomade technology (e.g. force touch). It allows to place the tactile zone(s) on the inner side of the strap to minimize the impact on design, use any applicable material for the strap (e.g. leather, plastic, metal), offer pressure sensing in addition to the basic set of sensing (e.g. swipe, touch) to enrich UI design.

FIG. 5A (right figure) shows an implementation of this embodiment which provides more than one active zone/sensor for each tactile zone 501, 503, e.g. two active zones/nanomade sensors 501*a*, 501*b* for the index zone 501, and four active zones/nanomade sensors 503*a* for the thumb zone 503.

A person skilled in the art would appreciate that this smart strap/band solution opens the door of new possibilities of gestures and combinations thereof. This allows to offer new basic and advanced possible gestures as shown in FIG. 5B.

Figure 5B:
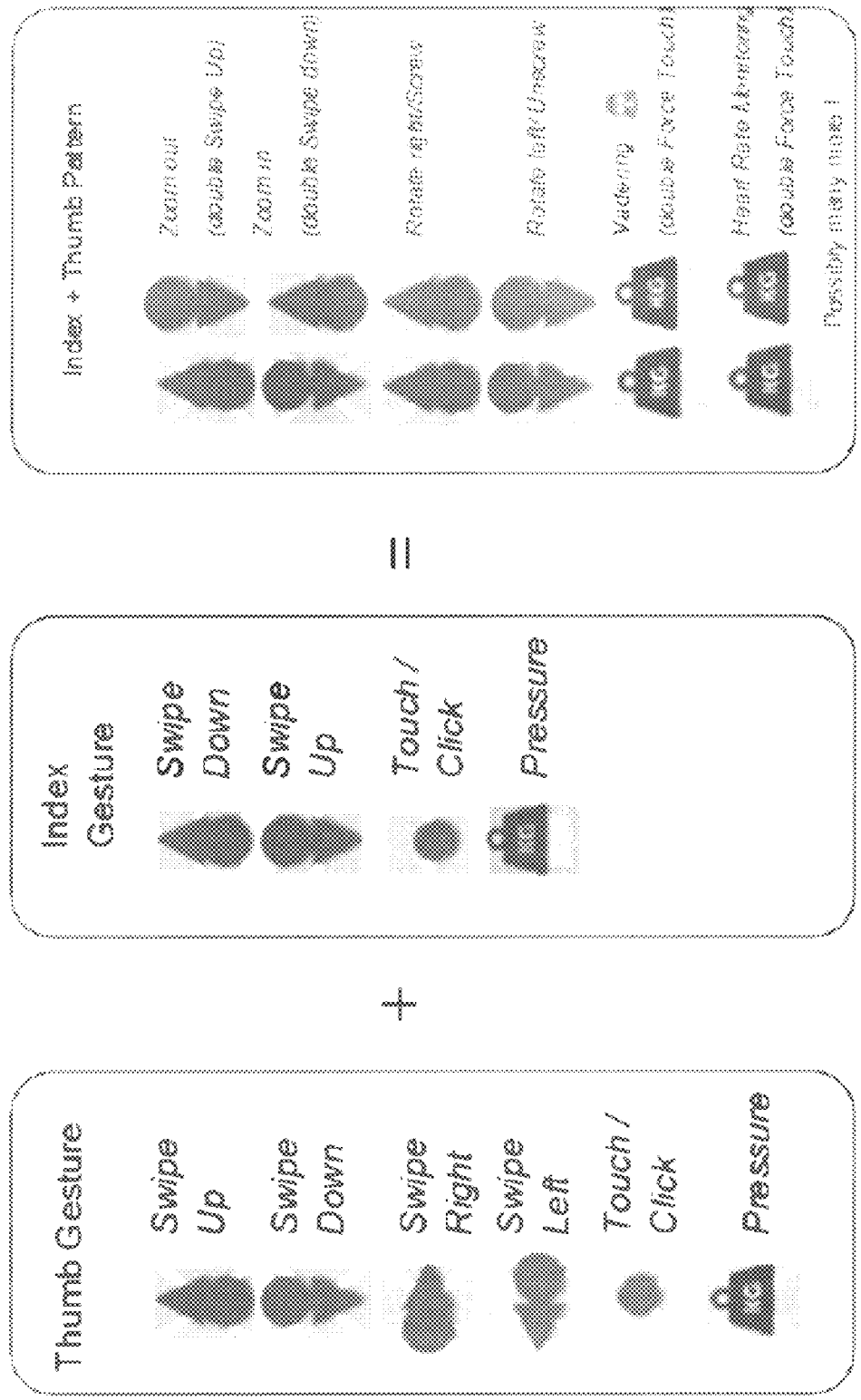
FIG. 5B shows possible gestures supported by the example wearable electronic device of FIG. 5A.

FIG. 5B shows possible gestures supported by the example wearable electronic devices of FIG. 5A. Gestures of FIG. 5B are provided as examples, a person skilled in the art would appreciate more possible ones, e.g. examples provided in FIG. 2E and FIG. 4E.

Figure 5C:
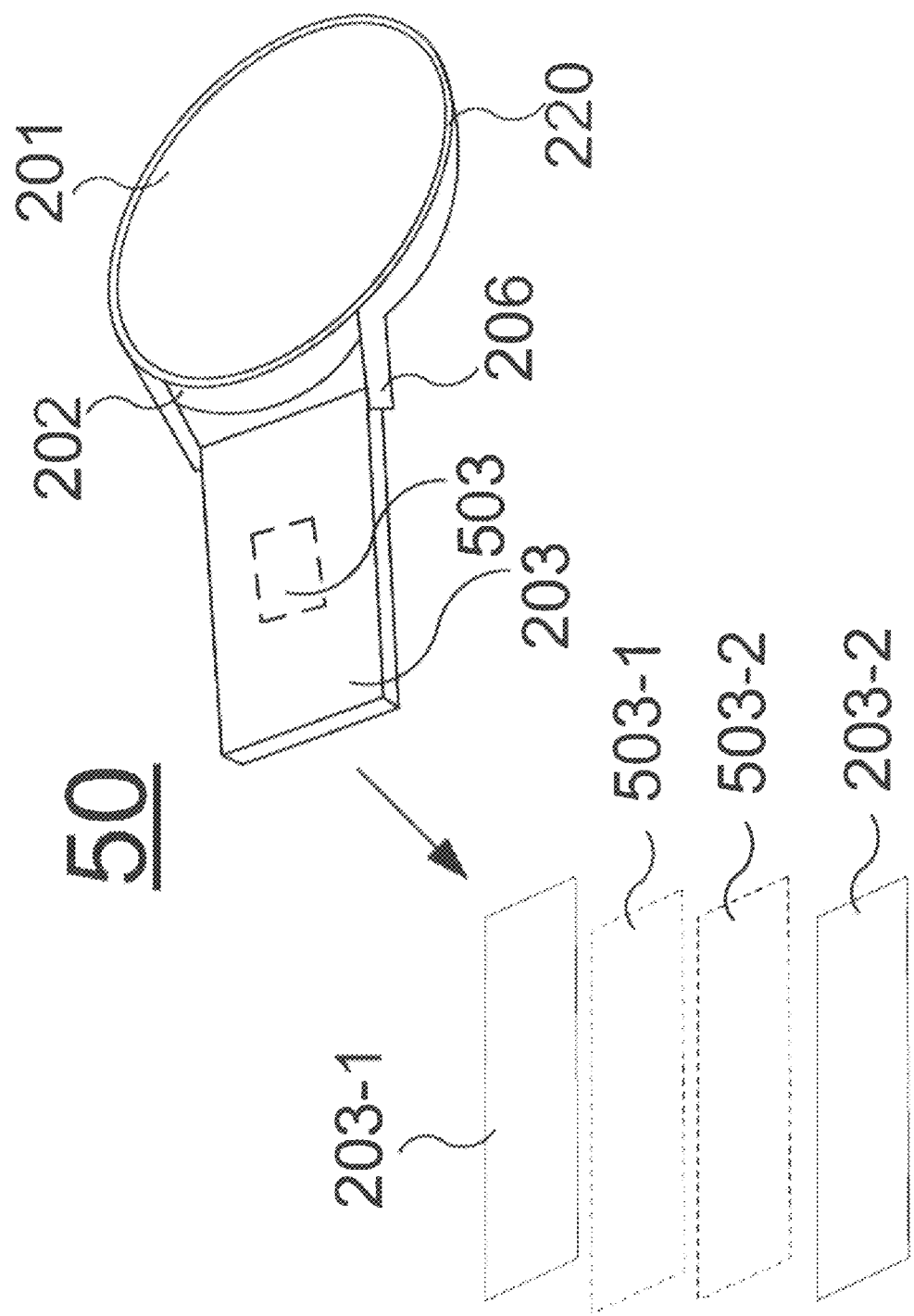
FIG. 5C shows an example implementation of the example wearable electronic device of FIG. 5A.

FIG. 5C shows an example implementation of the example wearable electronic devices of FIG. 5A. A simplified broken view of the strap/band 203 of the smart watch 50 is shown at the left corner. The applied material layer(s) 203-1, 203-2 (e.g. leather, plastic, or metal) may be 1-1.7 mm thick. Beneath the applied material, the active tactile layer(s) 503-1, 503-2 may be of a 22 mm*15 mm dimension.

Figure 6:
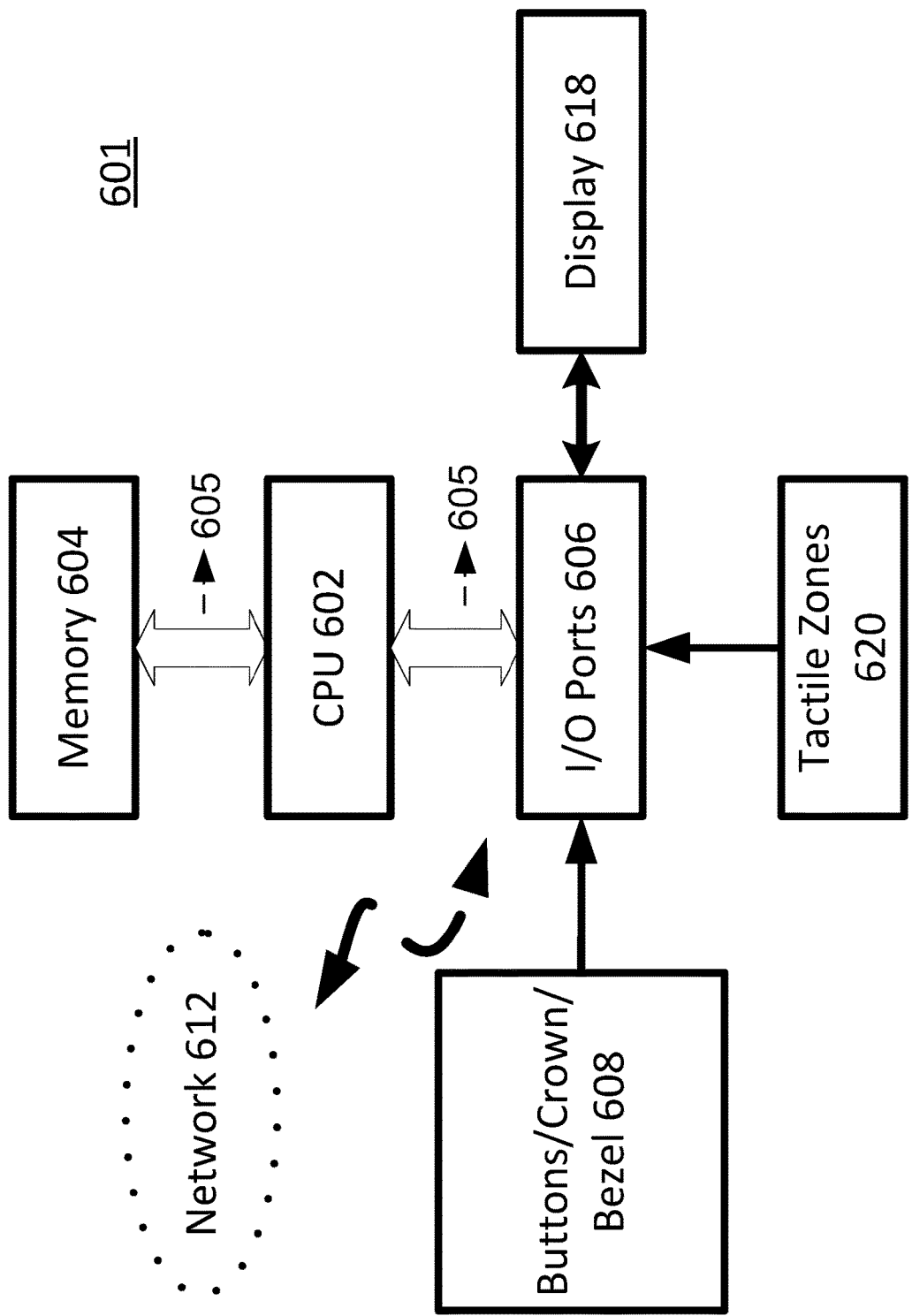
FIG. 6 illustrates major electrical components of an exemplary electronic device employing the present disclosure.

FIG. 6 illustrates major electrical components of a wearable electronic device 601 (e.g. the wearable electronic device illustrated in FIG. 1-FIG. 5C) employing the present disclosure. The wearable electronic device 601 includes one or more central processing units (CPUs) 602 (e.g. one or more application processors) which are primarily responsible for carrying out arithmetic, logic, and control operations. The CPU 602 may include a floating-point unit (FPU) and/or a co-processor (not shown). Additionally, the CPU 602 may be a general-purpose processor, a digital signal processor (DSP), or other state machine circuit.

A memory 604 for storage of data and program code/instructions is coupled with the CPU 602 through a system bus 605. The memory 604 may include a memory cache, random access memory (RAM), video RAM (VRAM), and/or read only memory (ROM). In addition, the memory 604 may encompass mass storage media, such as magnetic and optical memory media.

The CPU 602 also communicates with input/output (I/O) ports 606 through the system bus 605. The I/O ports 606 allow the CPU 602 to receive and transmit data from and to the outside environment. Thus, various input and output components of the electronic device 601, such as the display 618, the input buttons/crown/bezel 608, and active tactile zones 620 are coupled to the I/O ports 606 for transmitting and receiving data to and from a user, respectively. The CPU 602 may access the I/O ports 606 as either memory mapped I/O space or as separately mapped I/O space. In addition, the I/O ports 606 may be configured to support interrupt-driven CPU access.

According to an embodiment of the present disclosure, the I/O ports 606 are also coupled to a network 612, such as the Internet/wireless communications network. Preferably, communications over the network 612 is achieved over a wireless connection between the electronic device 601 and a network server (not shown). Various communication protocols may be supported by the wearable electronic device 601, including but not limited to Hyper Text Transfer Protocol (HTTP), Post Office Protocol (POP), Time Division Multiple Access (TDMA), Code Division Multiple Access (CDMA), Wireless Application Protocol (WAP), third generation partnership project (3GPP) communications technologies (e.g. Global System for Mobile communication (GSM), Wideband Code Division Multiple Access (WCDMA), Long-Term Evolution (LTE), LTE-Advanced (LTE-A), fifth generation (5G)), WI-FI (the name of a popular wireless networking technology that uses radio waves to provide wireless high-speed Internet and network connections, WI-FI™ is a trademarked phrase that means The Institute of Electrical and Electronics Engineers (IEEE) 802.11x) and BLUETOOTH (a wireless technology standard for exchanging data over short distances, which is managed by BLUETOOTH Special Interest Group). BLUETOOTH™ is a Trademark owned by Telefonaktiebolaget LM Ericsson. It should be noted that the protocols listed above are provided as examples only. It is contemplated that many other protocols known by those skilled in the art may be supported by the wearable electronic device 601. In one embodiment of the present disclosure, the wearable electronic device 601 is working as a WI-FI access point (AP).

Figure 7A:
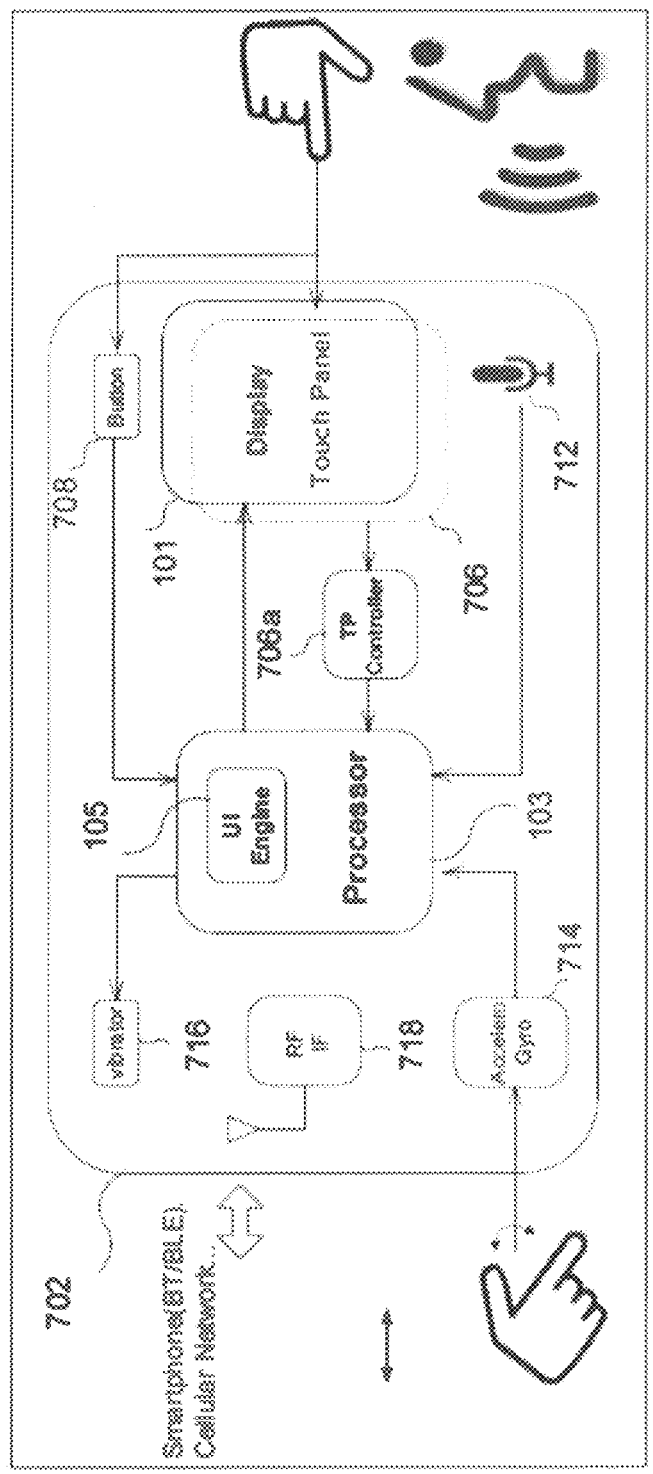
FIG. 7A shows a schematic block diagram of the components of a user interface of the wearable electronic device according to FIG. 1 without showing active tactile zone implementation.
Figure 7B:
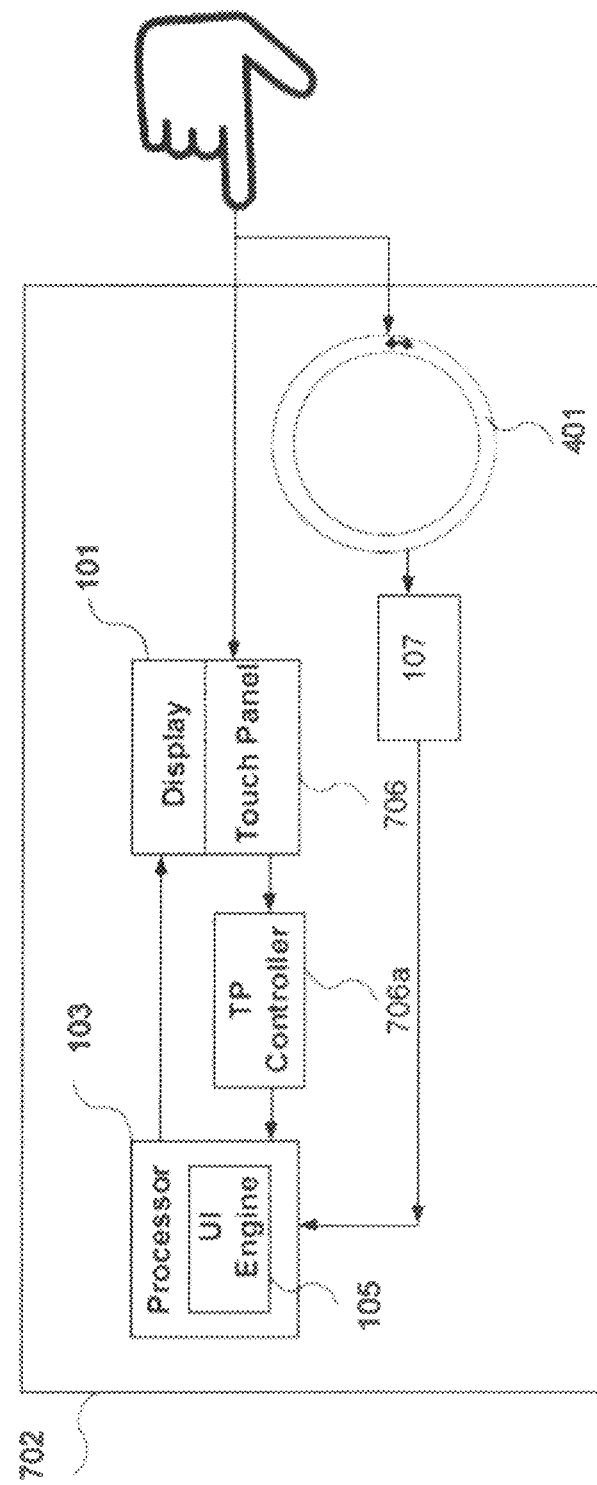
FIG. 7B shows a schematic block diagram of the components of a user interface of the wearable electronic device according to FIG. 1 with active tactile zone implementation shown.

FIGS. 7A and 7B shows a schematic block diagram of the components of a user interface of the wearable electronic device 10 (e.g. a smart watch) according to FIG. 1. Further, FIG. 7A shows a schematic block diagram of a wearable electronic device 702 without showing active tactile zone implementation. FIG. 7B shows a schematic block diagram of the wearable electronic device 702 with active tactile zone(s) implementation 401 shown.

Figure 8:
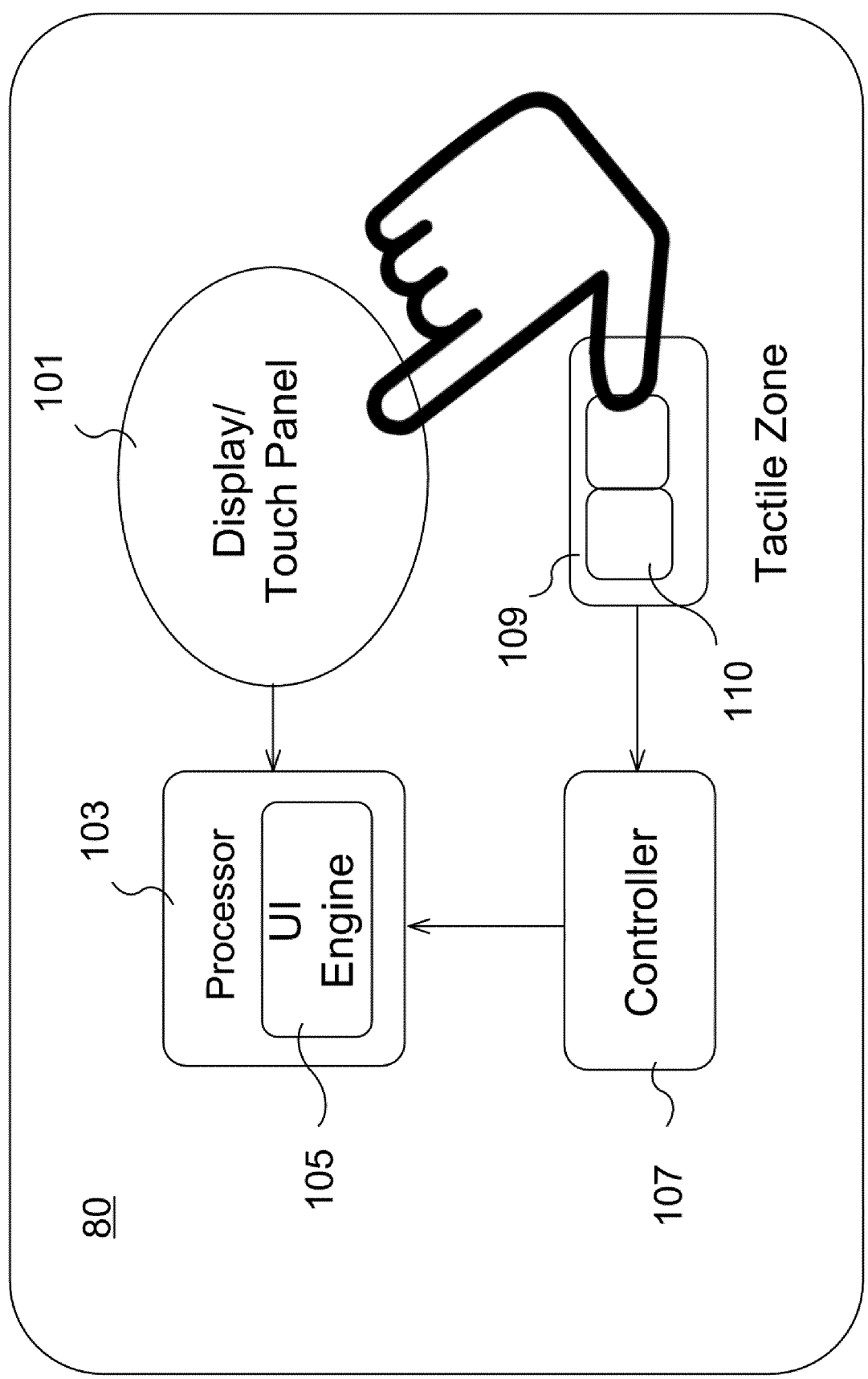
FIG. 8 shows another example schematic diagram of a wearable electronic device according to an embodiment.

FIG. 8 shows another example schematic diagram of a wearable electronic device 80 according to an embodiment. In this implementation, gesture(s) input from touch panel and active tactile zone(s) can be combined to enrich UI design. Similar to FIG. 2E, a person skilled in the art would appreciate that any combination can be exploited and a rich set of gestures can be offered, such as examples provided in FIG. 4E and FIG. 5B.

Advantage of embodiments of this disclosure lies at least in the following. At least two active tactile zones outside the display area that can bring sophisticated gesture patterns when combined together, each zone can be reached by a finger, e.g. an index finger, and another finger, e.g. a thumb finger, at substantially the same time to offer a multi-touch patterns that are intuitive and comfortable to use.

This provides following benefits over conventional arts. A larger set of gestures than conventional gesture inputs is supported. Further, the display is not hidden. The usability of the device and thus the user convenience is improved. The novel functionality of the claimed device has minimal impact on design and mechanics, without affecting the waterproofness of the device. Moreover, sliding both thumb finger and index finger to interact with a smart watch is user friendly. Thus, supporting sliding gesture detection of both fingers introduces a user friendly UI design.

FIG. 9 provides a table showing advantages of the active tactile zone solution, i.e. Thumb & Index Touch, provided by this disclosure over conventional arts.

In this disclosure, "active" (tactile zone) means the tactile zone remains in a power saving standby mode (similar to touchscreen standby mode, or fingerprint reader standby mode), but ready to respond quickly to any gesture input.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include," "have," "with," or other variants thereof are used in either the detailed description or the claims, such terms are intended to be inclusive in a manner similar to the term "comprise." Also, the terms "exemplary," "for example" and "e.g." are merely meant as an example, rather than the best or optimal. The terms "coupled" and "connected," along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as further described herein.

The invention claimed is:

1. A wearable electronic device, comprising:
a housing comprising an edge;
upper lugs comprising an upper left lug and an upper right lug, wherein the upper lugs are on the edge of the housing and are configured to support a band;
lower lugs comprising a lower left lug and a lower right lug, wherein the lower lugs are on the edge of the housing and are configured to support the band;
a display coupled to the housing and having a viewable area for presenting visual information;
a first touch sensitive area disposed outside of the viewable area of the display and configured to support a sliding gesture detection, wherein the first touch sensitive area comprises an index tactile zone disposed between the upper right lug of the wearable electronic device and a center of the edge of the housing, and wherein the first touch sensitive area comprises two active areas;
a second touch sensitive area disposed outside of the viewable area of the display and configured to support the sliding gesture detection, wherein the second touch sensitive area comprises a thumb tactile zone disposed on the edge of the housing between the lower left lug and the lower right lug; and
a processor disposed within the housing and coupled to the display, the first touch sensitive area, and the second touch sensitive area and configured to operate the wearable electronic device.

2. The wearable electronic device of claim 1, further comprising the band attached to the housing and configured to secure the wearable electronic device to a user.

3. The wearable electronic device of claim 1, wherein the first touch sensitive area is pressure sensitive.

4. The wearable electronic device of claim 1, wherein the second touch sensitive area is pressure sensitive.

5. The wearable electronic device of claim 1, wherein the first touch sensitive area is fingerprint sensitive.

6. The wearable electronic device of claim 1, wherein the second touch sensitive area is fingerprint sensitive.

7. The wearable electronic device of claim 1, wherein the index tactile zone is configured to receive an input from an index finger of a user.

8. The wearable electronic device of claim 1, wherein the thumb tactile zone is configured to receive an input from a thumb of a user.

9. The wearable electronic device of claim 1, wherein the first touch sensitive area is configured to detect touch gestures comprising swiping up and swiping down.

10. The wearable electronic device of claim 1, wherein the second touch sensitive area is configured to detect touch gestures comprising swiping left and swiping right.

11. The wearable electronic device of claim 1, wherein the first touch sensitive area and the second touch sensitive area are configured to receive touch gestures comprising zooming in and zooming out.

12. The wearable electronic device of claim 1, wherein the first touch sensitive area and the second touch sensitive area are configured to receive touch gestures comprising screwing and unscrewing.

13. The wearable electronic device of claim 1, further comprising a crown on the edge of the housing, and wherein the index tactile zone is disposed between the upper right lug of the wearable electronic device and the crown.

14. The wearable electronic device of claim 1, wherein the second touch sensitive area comprises two active areas.

15. The wearable electronic device of claim 1, wherein the processor is coupled with the first touch sensitive area and the second touch sensitive area using a microprocessor.

16. The wearable electronic device of claim 15, wherein the microprocessor is configured to:
receive a first input from the first touch sensitive area and a second input from the second touch sensitive area; and
send one output to the processor in consideration of both the first input and the second input.

17. The wearable electronic device of claim 1, wherein the processor is configured to output an instruction of providing feedback to a user in response to a first gesture performed on the first touch sensitive area and a second gesture performed on the second touch sensitive area.

18. The wearable electronic device of claim 17, wherein the feedback comprises at least one or any combination of:
the visual information presented in the viewable area of the display;
vibration of the wearable electronic device;
illumination of the display;
locking of the display;
unlocking of the display;
power on of the wearable electronic device;
picking up a telephone call;
connection of a wireless communication connection;
power off of the wearable electronic device;
hanging off the telephone call;
disconnection of the wireless communication connection;
dialing an emergency call; or
voice of an intelligent personal assistant.

* * * * *